United States Patent
Sun et al.

(10) Patent No.: US 12,108,353 B2
(45) Date of Patent: Oct. 1, 2024

(54) TIME SYNCHRONIZATION METHOD, UE, BASE STATION, DEVICE AND COMPUTER READABLE STORAGE MEDIUM

(71) Applicant: Samsung Electronics Co., Ltd., Suwon-si (KR)

(72) Inventors: Feifei Sun, Beijing (CN); Qi Xiong, Beijing (CN); Chen Qian, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 157 days.

(21) Appl. No.: 17/430,861

(22) PCT Filed: Feb. 14, 2020

(86) PCT No.: PCT/KR2020/002090
§ 371 (c)(1),
(2) Date: Aug. 13, 2021

(87) PCT Pub. No.: WO2020/167013
PCT Pub. Date: Aug. 20, 2020

(65) Prior Publication Data
US 2022/0039045 A1    Feb. 3, 2022

(30) Foreign Application Priority Data

Feb. 14, 2019  (CN) .......................... 201910115006.6
Apr. 24, 2019  (CN) .......................... 201910335867.5
Sep. 27, 2019  (CN) .......................... 201910924951.0

(51) Int. Cl.
*H04W 56/00*    (2009.01)
*H04J 3/06*    (2006.01)

(52) U.S. Cl.
CPC ....... *H04W 56/0045* (2013.01); *H04J 3/0682* (2013.01); *H04W 56/0015* (2013.01); *H04W 56/0055* (2013.01)

(58) Field of Classification Search
CPC . H04J 3/0682; H04W 56/003; H04W 56/004; H04W 56/0045; H04W 56/0055
See application file for complete search history.

(56) References Cited

U.S. PATENT DOCUMENTS

2012/0120821 A1    5/2012  Kazmi et al.
2015/0215887 A1*   7/2015  Nejatian ........... H04W 56/0045
                                                 370/350

(Continued)

OTHER PUBLICATIONS

NTT DOCOMO, Inc., 'Time Synchronisation for IIot', R2-1818254, 3GPP TSG-RAN WG2 Meeting #104, Nov. 2, 2018, Spoken, USA, Sections 2.1.1.3, 2.1.3, 2.2; and table 3.

(Continued)

*Primary Examiner* — Pao Sinkantarakorn
(74) *Attorney, Agent, or Firm* — Jefferson IP Law, LLP

(57) ABSTRACT

Embodiments of the present application provide a time synchronization method, UE, base station, device, and computer readable storage medium, wherein the time synchronization method includes receiving indication information, the indication information being used to indicate propagation delay between the UE and a base station and/or time information of a time sensitive network (TSN); determining a time granularity of one bit of the indication information; and performing TSN time synchronization according to the indication information and the time granularity of one bit of the indication information. The present application achieves more accurate time synchronization of a time sensitive network (TSN).

20 Claims, 11 Drawing Sheets

(56) References Cited

U.S. PATENT DOCUMENTS

| | | | |
|---|---|---|---|
| 2016/0345281 A1 | 11/2016 | Murray | |
| 2019/0239172 A1* | 8/2019 | Hampel | H04W 56/0065 |
| 2021/0345272 A1* | 11/2021 | Chatterjee | H04W 56/0045 |
| 2021/0392601 A1* | 12/2021 | Takeda | H04W 56/0045 |
| 2022/0030530 A1* | 1/2022 | Munz | H04W 56/001 |
| 2022/0110139 A1* | 4/2022 | Pham Van | H04W 72/1273 |

OTHER PUBLICATIONS

Intel Corporation, 'Tsn evaluations for IIoT requirements', R1-1900500, 3GPP TSG RAN WG1 Ad-Hoc Meeting 1901, Jan. 12, 2019, Taipei, Taiwan, Sections 4-5.

Huawei et al., 'Evaluation on TSN requirements', R1-1901252, 3GPP TSG RAN WG1 Ad-Hoc Meeting 1901, Jan. 12, 2019, Taipei, Taiwan, Sections 3-3.2.

Oppo, 'Time Synchronization for IIoT', R2-1817247, 3GPP TSG-RAN WG2 Meeting #104, Nov. 2, 2018, Spoken, USA, Section 2.

Chinese Office Action dated Apr. 13, 2023, issued in Chinese Application No. 201910924951.0.

* cited by examiner

TIME SYNCHRONIZATION METHOD, UE, BASE STATION, DEVICE AND COMPUTER READABLE STORAGE MEDIUM

TECHNICAL FIELD

The present application relates to wireless communication technologies, and particularly, the present application relates to a time synchronization method, UE, base station, device, and computer readable storage medium.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE OF INVENTION

Solution to Problem

A time synchronization method in a wireless communication system, performed by a user equipment, the method comprising: receiving indication information, wherein the indication information being used to indicate at least of a propagation delay between the UE and a base station or time information of a time sensitive network (TSN); determining a time granularity of one bit of the indication information; and performing TSN time synchronization according to the indication information and the time granularity of one bit of the indication information.

BRIEF DESCRIPTION OF DRAWINGS

In order to more clearly illustrate the technical solutions in the embodiments of the present application, the drawings used in the description of the embodiments of the present application will be briefly described below.

BEST MODE FOR CARRYING OUT THE INVENTION

Figure 1:
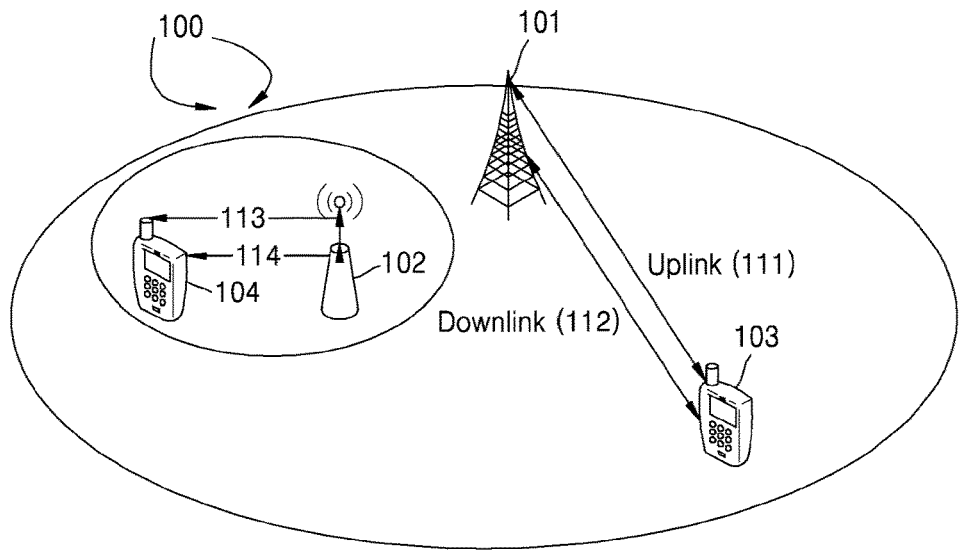
FIG. 1 is a schematic diagram of an architecture of a wireless communication system provided by an embodiment of the present application.

For the defects in the prior art, the present application provides a time synchronization method, UE, base station, device, and computer readable storage medium to solve the problem of how to implement a more accurate time synchronization of a time sensitive network (TSN).

In a first aspect, a time synchronization method is provided, applied to a UE, comprising: receiving indication information, wherein the indication information is used to indicate propagation delay between the UE and a base station and/or time information of a time sensitive network (TSN); determining a time granularity of one bit of the indication information; and performing TSN time synchronization according to the indication information and the time granularity of one bit of the indication information.

In an exemplary embodiment, wherein the performing TSN time synchronization according to the indication information and the time granularity of one bit of the indication information comprises: determining a rough time offset according to receiving a timing advance command transmitted by the base station; performing a fine time offset according to the indication information and the time granularity of one bit of the indication information; and performing the TSN time synchronization according to the rough time offset and the fine time offset.

In an exemplary embodiment, the method comprising: adjusting an uplink transmission time according to the indication information and the time granularity of one bit of the indication information.

In an exemplary embodiment, wherein the adjusting uplink transmission time according to the indication information and the time granularity of one bit of the indication information comprises at least one of the following: obtaining a propagation delay according to the indication information and the time granularity of one bit of the indication information, and compensating the propagation delay as the uplink transmission time, based on downlink transmission time; and obtaining the propagation delay according to the indication information and the time granularity of one bit of the indication information, and additionally compensating the propagation delay as the uplink transmission time based on the current uplink transmission time.

In an exemplary embodiment, the indication information comprises at least one of the following: time uncertainty information; TSN clock time information; and/or reference time domain position corresponding to the TSN clock time information.

In an exemplary embodiment, the time information of the TSN comprises at least one of the following: propagation delay information between the UE and the base station and time information of the TSN; and or time information of the TSN after compensation of propagation delay between the UE and the base station by the base station.

In an exemplary embodiment, the determining time granularity of one bit of the indication information comprises at least one of the following: determining the time granularity of one bit of the indication information according to a pre-defined time granularity; directly configuring the time granularity according to a radio resource control (RRC) signaling to determine the time granularity of one bit of the indication information; determining the time granularity of one bit of the indication information according to a cell radius; determining the time granularity of one bit of the indication information according to a PRACH format; determining the time granularity of one bit of the indication information according to the subcarrier spacing for uplink transmission; determining the time granularity of one bit of the indication information according to the format of an uplink transmission signal measured by the base station; or determining the time granularity of one bit of the indication information according to the timing advance command.

In an exemplary embodiment, The method further comprising: determining the number of bits of the indication information;

and the determining the number of bits of the indication information comprises at least one of the following: determining the number of bits according to pre-set number of bits; determining the number of bits according to the configured number of bits by the RRC signaling directly; determining the number of bits according to the cell radius; determining the number of bits according to the PRACH format; determining the number of bits according to the subcarrier spacing of the uplink transmission signal; determining the number of bits according to a subcarrier spacing of a synchronization signal block (SSB) of the current base station; or determining the number of bits according to the downlink subcarrier spacing of the current bandwidth part (BWP). In a second aspect, a time synchronization method is provided, applied to a base station, comprising: receiving an uplink transmission signal from at least one UE; estimating a propagation delay of each UE according to the uplink transmission signal; and transmitting corresponding indication information to each UE according to the propagation delay of each UE, wherein the indication information is used to indicate propagation delay between each UE and the base station and/or the time information of the TSN.

In a third aspect, a UE is provided, comprising: a first processing module, configured to receive indication information of the TSN time synchronization, wherein the indication information is used for indicating propagation delay between the UE and a base station and/or time information of the TSN; a second processing module, configured to determine a time granularity of one bit of the indication information; and a third processing module, configured to perform TSN time synchronization according to the indication information and the time granularity of one bit of the indication information.

In a fourth aspect, a base station is provided, comprising: a fourth processing module, configured to receive an uplink transmission signal of at least one UE; a fifth processing module, configured to estimate a propagation delay of each UE according to the uplink transmission signal; and a sixth processing module, configured to transmit corresponding indication information to each UE according to the propagation delay of each UE, wherein the indication information is used to indicate propagation delay between each UE and the base station and/or the time information of the TSN.

In a fifth aspect, a terminal device is provided, comprising: a processor; and a memory configured to store machine readable instructions that, when executed by the processor, cause the processor to perform the time synchronization method in the first aspect.

In a sixth aspect, a base station device is provided, comprising: a processor; and a memory configured to store machine readable instructions that, when executed by the processor, cause the processor to perform the time synchronization method in the second aspect.

In a seventh aspect, the present application provides a computer readable storage medium storing a computer program for performing the time synchronization method in the first aspect of the present application.

In an eighth aspect, the present application provides a computer readable storage medium storing a computer program for performing the time synchronization method in the second aspect of the present application.

The technical solutions provided by the embodiments of the present application have at least the following beneficial effects:

achieving more accurate time synchronization of a time sensitive network (TSN).

Additional aspects and advantages of the present application will be partially appreciated and become apparent from the description below, or will be well learned from the practices of the present application.

Mode for the Invention

Embodiments of the present application will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present disclosure and should not be regarded as any limitations thereto.

It should be understood by those skill in the art that singular forms "a", "an", "the", and "said" may be intended to include plural forms as well, unless otherwise stated. It should be further understood that terms "include" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed units or combinations thereof.

It can be understood by those skilled in the art that all terms (comprising technical and scientific terms) used here have the same meaning as commonly understood by those of ordinary skill in the art to which the present application belongs, unless otherwise defined. It should also be understood that terms such as those defined in a general dictionary should be understood to have meaning consistent with the meaning in the context of the related art, and will not be explained as an idealized or excessively formal meaning unless specifically defined as here.

Ultra-reliable Low-delay Communication (URLLC) proposed in Fifth-Generation (5G) mobile communication, provides requirements for both delay and reliability. 3GPP Rel-15 can support less than 1 ms of end-to-end delays and $10^{-5}$ of block error rate. Furthermore, in addition to the requirements of high reliability and low delay, for characteristics of services such as Industrial Internet of Things, Augmented Reality (AR), Virtual Reality (VR) and the like, strict time synchronization between devices is also required. For example, in the 3GPP standard, the requirements of Industrial Internet of Things, TS 22.104, is explicitly required that time synchronization needs to be <1 μs. The time synchronization error is an error between two terminal times. In some scenarios, the two terminals access a same base station (same cell) through wireless network, for example, communication between devices in a factory. In other scenarios, two terminals may be connected to different base stations, and a core network is used to establish a connection between base stations. Wherein, the core network or the base station is connected to the server for the service to perform time synchronization, and meanwhile, uplink or downlink data transmission, for example, instruction exchange, may also be performed. In addition, in some scenarios (such as factory indoor scenes), if the cell radius is small (for example, a cell radius is less than 20 meters), then the propagation delay of the wireless signal is only several tens of nanoseconds. However, in other scenarios (such as power control systems), the cell radius may be several tens of kilometers, and the propagation delay of the wireless signal may be greater than 500 nanoseconds. At this time, if the time synchronization error of the terminal connecting with a base station through another terminal is considered, it may be greater than the requirement of 1 μs. Therefore, it is necessary to compensate for the propagation delay.

In the prior art, since there is no such high requirement for time synchronization, the time error of different terminals arriving at the base station is within a cyclic prefix (CP) by means of Timing Advance (TA), thereby guaranteeing orthogonality of Orthogonal Frequency Division Multiplexing (OFDM). In Long Term Evaluation (LTE) and New Radio (NR) systems, the typical CP length is 4.69~5.21 μs, which requires far less accuracy than a time-sensitive network (TSN).

In order to make the objects, technical solutions and advantages of the present application more clear, the embodiments of the present application will be further described in detail below with reference to the accompanying drawings.

A schematic diagram of a wireless communication system architecture provided in an embodiment of the present application is shown in FIG. 1.

The wireless communication system 100 includes one or more fixed infrastructure units to form a network distributed over a geographic area. The basic unit may be referred to as an Access Point (AP), an Access Terminal (AT), a Base Station (BS), a Node B (Node-B), and an evolved NodeB (eNB), a Next Generation Base Station (gNB) or other terminology items used in the prior art. One or more infrastructure units 101 and infrastructure units 102 provide services for a number of Mobile Stations (MS) or User Equipments (UE) or terminal devices in the service area. Optionally, the UE 103 detects indication information transmitted by the base station 101, 111 represents an uplink between the UE 103 and the base station 101, and 112 represents a downlink between the UE 103 and the base station 101. The UE 104 detects the indication information transmitted by the base station 102, the service area is within the cell or cell sector range, 113 represents the uplink between the UE 104 and the base station 102, and 114 represents the downlink between the UE 104 and the base station 102. In some systems, one or more base stations may be communicatively coupled to a controller forming an access network, and the controller is communicatively coupled to one or more core networks. Base stations may be synchronized by the core network or the internal or external clock, and a plurality of UEs connected to one base station may achieve the TSN time synchronization effect by synchronizing with the time of the base station or the internal clock in the wireless communication network. Since the base station has been synchronized timely, then a plurality of UEs connected to different base stations may be considered to be synchronized timely. The synchronization error includes a synchronization error between a UE and a base station, a synchronization error between base stations, or the like; or, a plurality of UEs may synchronize with an external clock through a higher layer signaling.

Embodiments of the present application are not limited to any particular wireless communication system.

Since the propagation of the electromagnetic wave requires time, there is a certain propagation delay in the time for the signal transmitted by the base station to be received by the UE, and there is also a certain propagation delay in the time for the signal transmitted by the UE to be received by the base station.

Figure 2:
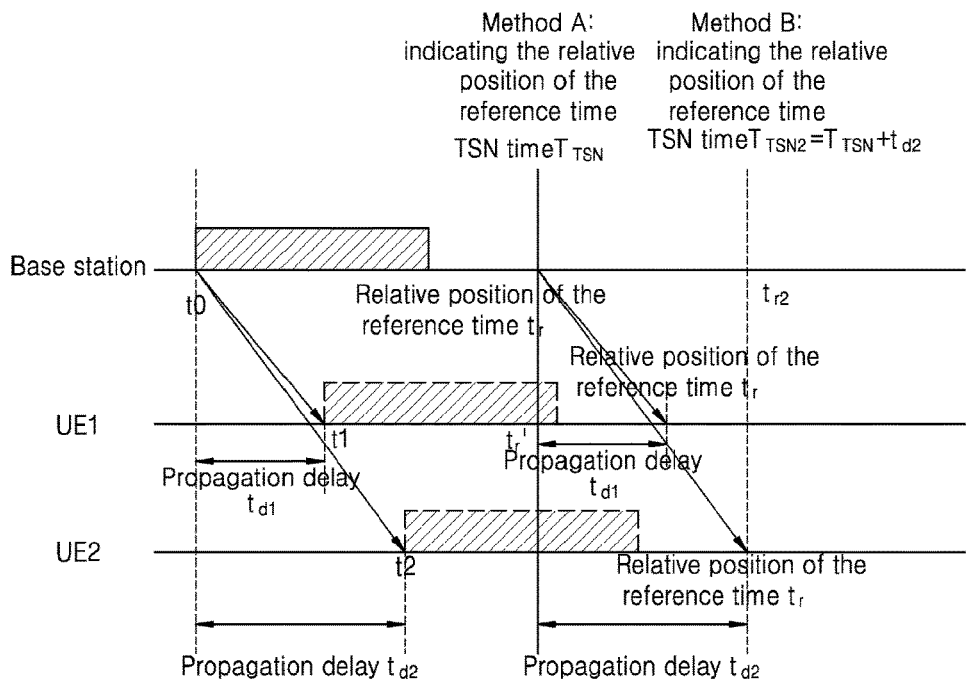
FIG. 2 is a schematic diagram of a propagation delay provided by an embodiment of the present application.

FIG. 2 is a schematic diagram of a propagation delay provided by an embodiment of the present application.

As shown in FIG. 2, the base station transmits a downlink signal at time t0. Since the electromagnetic wave propagation paths between UE1 and the base station as well as between the UE2 and the base station are different, the propagation delays are different. As shown in FIG. 2, UE1 receives a downlink signal at time t1, and UE2 receives a downlink signal at time t2. The propagation delays of UE1 and UE2 are t1-t0 and t240, respectively. However, UE1 or UE2 will understand that the relative time in the wireless system is t0 (the TSN time when the base station transmits at t0) instead of the corresponding actual TSN time at time t1 or t2. Therefore, there are errors between the different UEs and between the UEs and the base station as to the relative time in the wireless system and the actual clock time.

Embodiment 1

A time synchronization method is provided in the embodiment of the present application, and is applied to a UE.

Figure 3:
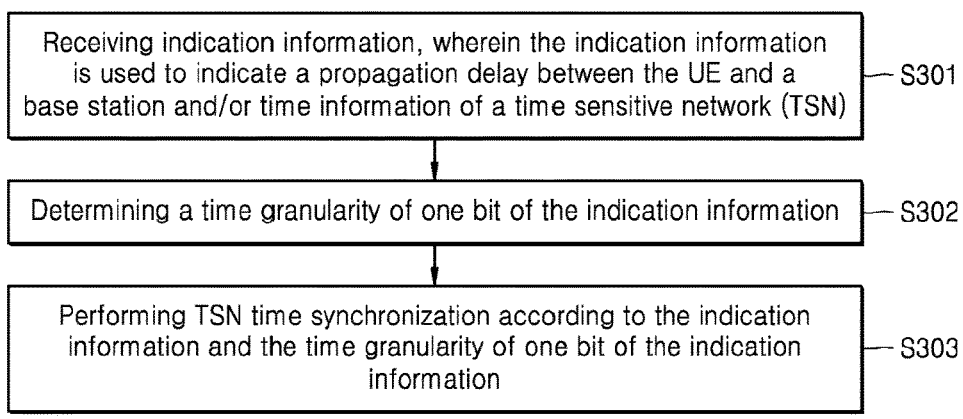
FIG. 3 is a schematic flowchart of a time synchronization method provided by an embodiment of the present application.

FIG. 3 is a schematic flowchart of a time synchronization method provided by an embodiment of the present application.

The schematic flowchart of the method is as shown in FIG. 3, and the method comprises:

Step S301: receiving indication information, the indication information being used to indicate propagation delay between the UE and a base station and/or time information of a time sensitive network (TSN);

Step S302: determining a time granularity of one bit of the indication information; and Step S303: performing TSN time synchronization according to the indication information and the time granularity of one bit of the indication information.

In the embodiment of the present application, the UE receives the indication information, where the indication information is used to indicate the propagation delay between the UE and the base station and/or the time sensitive network (TSN) time information; the UE determines the time granularity of one bit of the indication information; the UE performs TSN time synchronization according to the indication information and the time granularity of one bit of the indication information. Accordingly, it may be capable of achieving more accurate time synchronization of a Time sensitive network (TSN).

Optionally, the performing TSN time synchronization according to the indication information and the time granularity of one bit of the indication information, includes:

determining a rough time offset according to receiving a timing advance command transmitted by the base station;

determining a fine time offset according to the indication information and the time granularity of one bit of the indication information; and performing the TSN time synchronization according to the rough time offset and the fine time offset.

Optionally, the uplink transmission time is adjusted according to the indication information and the time granularity of one bit of the indication information.

Optionally, the adjusting uplink transmission time according to the indication information and the time granularity of one bit of the indication information, includes at least one of the following:

obtaining a propagation delay according to the indication information and the time granularity of one bit of the indication information, and compensating the propagation delay as an uplink transmission time based on downlink transmission time; and obtaining the propagation delay according to the indication information and the time granularity of one bit of the indication information, and additionally compensating the propagation delay as the uplink transmission time based on the current uplink transmission time.

Optionally, the indication information includes at least one of the following:

time uncertainty information; TSN clock time information; and reference time domain position corresponding to the TSN clock time information.

Optionally, the time information of the TSN includes at least one of the following:

propagation delay information between the UE and the base station and time information of the TSN; and the time information of the TSN after compensation of propagation delay between the UE and the base station by the base station.

Specifically, there are two methods for compensating for the propagation delay of the TSN time:

Method A: the UE receives the relative position (which corresponds to the TSN time) of the reference time transmitted by the base station in the wireless system, and the indication information for the uplink propagation delay; the UE performs time compensation according to the TSN time corresponding to the relative position of the reference time and the indication information for the uplink propagation delay, and obtains more accurate TSN time. The relative position of the reference time is predefined or configured along with the TSN time. Wherein, due to the relative position $t_r$ of the reference time for different UEs and corresponding TSN time $T_{TSN}$ thereof are identical, so they may be transmitted to a plurality of users by broadcasting. For example, it is transmitted in system information. However, since the propagation delay information of each user may be different, it is required to be transmitted through a UE-specific channel or message. It may also be transmitted by a plurality of UEs in a common mode, for example, group common downlink control information (DCI), or designing a MAC (Media Access Control) in the form of RAR (Random Access Response). PDU (Protocol Data Unit) is transmitted to a plurality of users through a PDSCH (Physical Downlink Shared Channel). Each user obtains the information, which is indicated to the user, by a predefined rule or a pre-configured parameter.

As shown in FIG. 2, UE1 receives the TSN time of the relative position of the reference time. The relative time in the wireless system considered by UE1 is the Y-th symbol of the N-th slot of the N slots of the M-th subframe in the system) $T_{TSN}$, and the propagation delay of UE1 $t_{d1}$. UE, according to propagation delay $t_{d1}$, compensates the relative position of the reference time $t_r$ and compensates as $t_r'$ (the relative position $t_r$ in the wireless system considered by UE1 corresponding to the base station the relative position of the reference time $t_r'$), to obtain more accurate TSN time synchronization with TSN time $T_{TSN}$ according to the relative position $t_{r0}$ of the reference time after compensation.

Method B: the base station estimates the uplink propagation delay, compensates in advance, and transmits the compensated TSN time to the UE. That is, at this time, the UE only needs to determine the TSN time of the reference position according to the TSN time transmitted by the base station and its corresponding reference position. Wherein, since each UE has different propagation delays, the base station needs to separately transmit the calibrated TSN time to each user. At this time, even if the relative time relative position of each TSN time (from the base station) may be the same (or may be different), each TSN time after compensating for the propagation delay may be different. In this case, the relative position of the reference time may be configured to all UEs by means of a predefined or broadcast manner, or may be transmitted to the UEs along with the compensated TSN time. Similarly, it may also be transmitted in a manner of a plurality of UEs sharing, for example, group common DCI, or a manner that a MAC PDU in the form of RAR is designed to be transmitted to a plurality of users through one PDSCH and each user, by pre-defined rules or pre-configured parameters, obtains the information indicated to the UE.

As shown in FIG. 2, since the base station estimates in advance that the propagation delay to UE2 is $t_{d2}$, the base station transmits the TSN time as $T_{TSN2}=T_{TSN}+t_{d2}$ to UE2. At this time, the position corresponding to the TSN time, that is, the relative position of the reference time considered by UE2, is the relative position in the wireless system. $t_r$. UE2 only needs to note the relative position $t_r$ considered by the UE in the wireless system, as the TSN time transmitted by the base station, without additional operations. Alternatively, the TSN time transmitted by the base station to UE2 is $T_{TSN}$, the time position indicated to the UE is $t_r$-$t_{d2}$. The two methods are equivalent and may be transparent to the UE depending on the implementation of the base station.

The base station may decide whether to apply method B according to the capability report on whether the UE supports method A. If the UE does not have the capability of method A, the base station may transmit the pre-compensated TSN time information and/or reference position information to the UE according to the propagation delay compensation for the UE. This method may also be applied to the case of the capability of supporting method A or having not yet able to perform capability reporting nor acquiring capability for the UE from the core network.

Optionally, before receiving the indication information, the method further includes:

Transmitting the uplink signal, wherein the uplink signal includes at least one of a PRACH (Physical Random Access Channel), a SRS (Sounding Reference Signal), a reference signal for measuring a propagation delay, and a pilot signal demodulated by the UE (DMRS, Demodulation Reference Signaling), a PUSCH (Physical Uplink Shared Channel) and a Physical Uplink Control Channel (PUCCH).

Optionally, the determining the time granularity of one bit of the indication information, includes at least one of the following:

determining the time granularity of one bit of the indication information according to pre-defined time granularity;

directly configuring the time granularity according to a radio resource control (RRC) signaling to determine the time granularity of one bit of the indication information;

determining the time granularity of one bit of the indication information according to a cell radius;

determining the time granularity of one bit of the indication information according to a PRACH format;

determining the time granularity of one bit of the indication information according to the PRACH preamble sequence number (index);

determining the time granularity of one bit of the indication information according to the RACH occasion (RO) corresponding to the PRACH;

determining the time granularity of one bit of the indication information according to the subcarrier spacing for uplink transmission;

determining the time granularity of one bit of the indication information according to the format of an uplink transmission signal measured by the base station; and determining the time granularity of one bit of the indication information according to the timing advance command.

Optionally, it also includes:

determining the number of bits of the indication information;

and the determining the number of bits of the indication information comprises at least one of the following:

determining the number of bits according to pre-set number of bits;

determining the number of bits according to the configured number of bits by the RRC signaling directly;

determining the number of bits according to the cell radius;

determining the number of bits according to the PRACH format;

determining the number of bits according to the PRACH preamble sequence number (index);

determining the number of bits according to the RO corresponding to the PRACH;

determining the number of bits according to the subcarrier spacing of the uplink transmission signal;

determining the number of bits according to a subcarrier spacing of a synchronization signal block (SSB) of the current base station; and determining the number of bits according to the downlink subcarrier spacing of the current bandwidth part (BWP).

Embodiment 2

Another time synchronization method is provided in the embodiment of the present application, and is applied to a base station.

Figure 4:
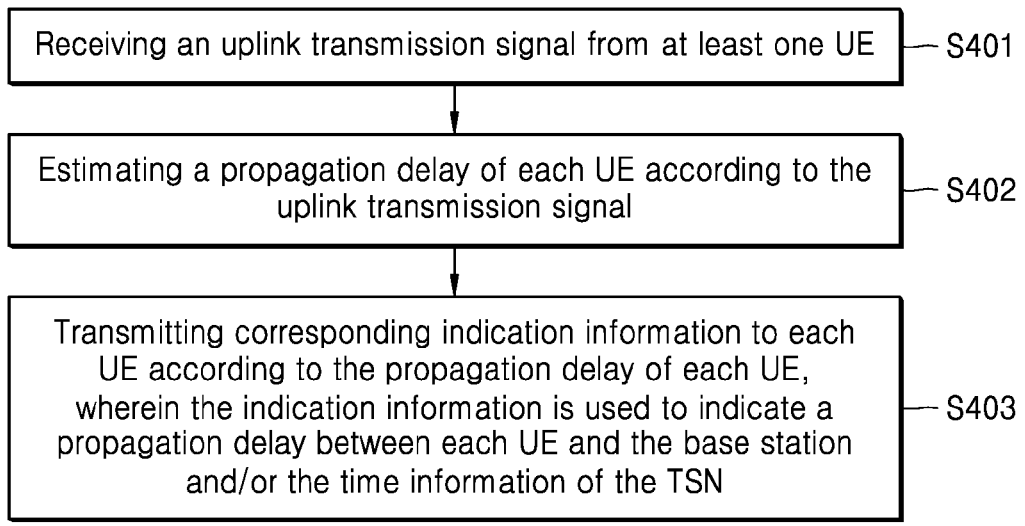
FIG. 4 is a schematic flowchart diagram of another time synchronization method provided by an embodiment of the present application.

FIG. 4 is a schematic flowchart diagram of another time synchronization method provided by an embodiment of the present application.

The schematic flowchart of the method is as shown in FIG. 4, and the method includes:

Step S401: receiving an uplink transmission signal from at least one UE;

Step S402: estimating a propagation delay of each UE according to the uplink transmission signal; and Step S403: transmitting corresponding indication information to each UE according to the propagation delay of each UE, the indication information being used to indicate propagation delay between each UE and the base station and/or the time information of the TSN.

In the embodiment of the present application, the base station receives the uplink transmitting signal of the at least one UE; the base station estimates the propagation delay of each UE according to the uplink transmitting signal; and the base station transmits corresponding indication information to the UE according to the propagation delay of each UE, the indication information being used to indicate the propagation delay between each UE and the base station and/or the Time information of the TSN. Accordingly, it may be capable of achieving more accurate time synchronization of a Time sensitive network (TSN).

Optionally, the base station separately transmits corresponding indication information to each UE, which may be performed in a UE-specific manner.

Optionally, the base station broadcasts the TSN time corresponding to the reference position to multiple or all UEs that require TSN time synchronization, and the base station separately transmits the propagation delay of each UE to each UE. Similarly, the propagation delay may also be transmitted by a UE-specific channel or signaling, or in a manner of a plurality of UEs sharing, for example, group common DCI, or a manner that a MAC PDU in the form of RAR is designed to be transmitted to a plurality of users through one PDSCH and the base station, by pre-defined rules or pre-configured parameters, transmits the information of each UE.

Optionally, the indication information includes at least one of the following:

the information indicating the propagation delay, the clock time information of the TSN after compensating for the propagation delay, the information for adjusting the uplink transmission advance, the time uncertainty, and the reference time domain position corresponding to the clock time information.

Optionally, the manner of configuring the indication information includes at least one of the following:

configuring the indication information according to the RRC signaling;

configuring the indication information according to the MAC layer instruction; and configuring the indication information according to the physical layer instruction.

Specifically, the base station receives the uplink signal transmitted by the UE, and the base station measures the uplink transmission signal of the UE and estimates the propagation delay of the UE to the base station. Ignoring the asymmetry of the uplink and downlink propagation paths, the base station estimates the uplink propagation delay from the UE to the base station.

The base station may choose to configure different information via different signaling. For example, the base station configures, to the UE, information such as clock time information of the TSN and reference time domain position corresponding to the clock time information, by using the RRC signaling. The information of the propagation delay (such as TA or other information for indicating the propagation delay) and other information is configured to the UE through MAC layer instructions or physical layer instructions.

In addition, when the propagation delay is greater than a certain value, the error is generated if there is no compensation; otherwise, if the propagation delay is small, the error will increase with compensation due to the error of the propagation delay itself. Therefore, the base station may determine, according to a request from the UE and/or the estimated propagation delay (or TA) information of the UE, whether to transmit the propagation delay to the UE or to indicate the UE to perform the propagation delay compensation. Specifically, if the base station estimates that the propagation delay of the UE is greater than a certain value, the base station transmits an indication to the UE that the propagation delay compensation is required (the base station performs directly indicating or indirectly indicating according to whether to transmit the propagation delay information). Wherein, the certain value may be determined according to the accuracy of the base station for estimating the propagation delay, for example, estimating the bandwidth of the used uplink signal, the capability of base station receiver, and the like. In particular, the base station may transmit, to the UE that requesting the delay compensation information, null information or may not transmit the compensation information.

Specifically, it may be implemented by the following steps:

The base station transmits information about the clock time (e.g., clock time, reference time domain position information, uncertainty, etc.) to the UE;

The base station transmits the propagation delay compensation information to the UE. Wherein, the propagation delay compensation information includes a propagation delay compensation request and/or information indicating the propagation delay.

Further, the base station determines whether to transmit the propagation delay compensation information to the UE, according to the UE request and/or the result of measuring the propagation delay.

Further, before the base station transmits the propagation delay compensation information to the UE, the base station receives the request which the UE requires the propagation delay compensation. Wherein, the request can be transmitted at the RRC or MAC or physical layer.

Embodiment 3

Figure 5:
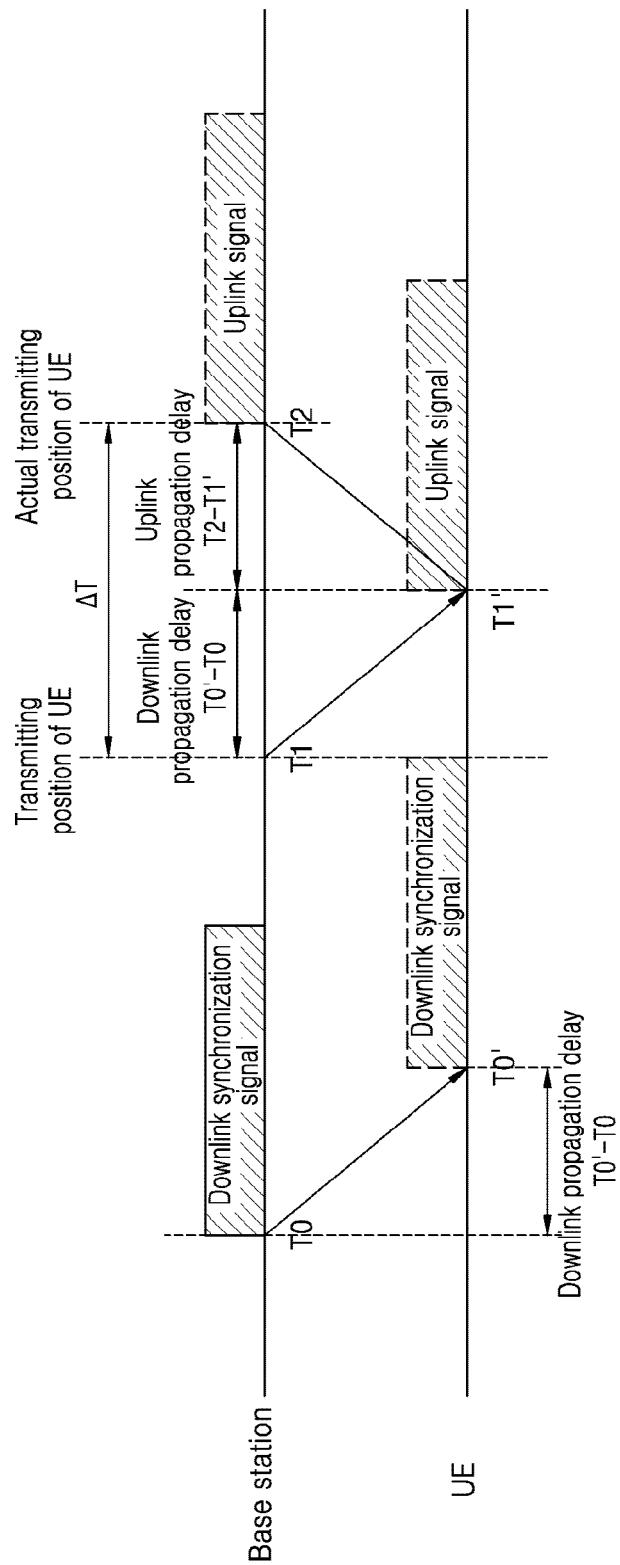
FIG. 5 is a schematic diagram of a base station estimating a propagation delay between a UE and the base station provided by an embodiment of the present application.

A comprehensive and detailed description to the time synchronization method of Embodiment 1 and Embodiment 2 of the present application is provided by the following embodiment:

FIG. 5 is a schematic diagram of the method of a base station estimating a propagation delay between a UE and the base station.

As shown in FIG. 5, the downlink synchronization signal is transmitted, and the UE receives the downlink synchronization signal, and performs downlink synchronization according to the downlink synchronization signal. The clock time for the base station to transmit the downlink synchronization signal is T0, and the relative time in the wireless communication system is $T_{5G}$. Specifically, the base station determines, according to the indication in the system information and a predetermined rule, that the transmission time of the downlink synchronization signal is the Y-th symbol of the N slots of the M-th subframe. Due to the propagation delay, the time of the downlink synchronization signal received by the UE is T0' And will note it as the relative time in the wireless system $T_{5G}$, that is, the Y-th symbol of N slots of the M-th subframe in the wireless communication system.

According to the pre-defined rule and base station configuration information, the UE starts the uplink transmission from the Y'-th symbol of the N'-th slot of the M'-th subframe in new rat (NR) system, i.e., the moment of T1'. The base station receives at time T2. Then, the base station may estimate the propagation delay by the difference ΔT=T2−T1 of the position T2 of the uplink signal actually received and the expected transmission start time T1 (the Y'-th symbol of the N'-th slot of the M'-th subframe in the NR system considered by the base station side). Assuming that the uplink and downlink propagation delays are equal, the propagation delay may be obtained, as $T_{DELAY}$=(T2−T1)/2.

Generally, since the UEs are in different positions with respect to the base station, the propagation delay of each UE may be different. In the OFDM system, in order to make the time difference of the uplink signals from different UEs to arrive at the base station within one CP to ensure orthogonality, the base station configures the timing advance (TA) for the UEs. In the LTE and the NR system, the command of the TA is carried in the Random Access Response (RAR), and the UE transmits the message 3 (Msg 3), that is, the UE transmits the message 3 (Msg 3) in advance, so that the time difference between the different UEs arriving at the base station is within a certain error. In the subsequent uplink transmission, the base station also performs TA estimation according to an uplink signal such as SRS, and further adjusts the UE by using a MAC command.

In the LTE system, 11 bits are used in the RAR to indicate the TA (the index value $T_A$ corresponding to the TA is in the range of 0~1282), and its granularity is 16 $T_S$ (0.52 μs); The value of $T_A$ is multiplied by 16 $T_S$ to obtain the actual adjustment value required relative to the current uplink time. In the connection state, due to the UE's movement, the needs of the required TA are further adjusted. At this time, the base station transmits a MAC Timing advance command MAC control element to the UE, which is 6 bits in total, and the corresponding index value. $T_A$ is in the range of 0~63. The UE side will calculate the latest TA adjustment value $N_{TA,new}$=$N_{TA,old}$+($T_A$−31)×16 (the unit is $T_S$) according to adjustment value of the latest timing advance $N_{TA,old}$ and the received TA command.

The NR system is similar to the LTE, and uses a 12-bit representation for the TA command in the random access procedure; the index value $T_A$ is in the range of $T_A$=0, 1, 2, . . . , 3846, the value that needs to be adjusted $N_{TA}$=$T_A$·16·64/$2^\mu$, wherein $2^\mu$15 kHz is the subcarrier spacing of the subsequent first uplink transmission, where μ=0, 1, 2, 3 represents 15 kHz, 30 kHz, 60 kHz, and 120 kHz, respectively. In the NR system, the time unit for TA adjustment is $T_C$=$T_S$/64. Accordingly, for μ=0, 1, 2, 3 the granularities adjusted by the TA are 16 $T_S$ (0.52 μs), 8 $T_S$ (0.26 μs), 4 $T_S$ (0.13 μs), 2 $T_S$ (0.065 μs), respectively. Similarly, in the connection state, the needs of the required TA are further adjusted due to the UE's movement. At this time, the base station transmits a MAC Timing advance command MAC control element to the UE, which is 6 bits in total, and the corresponding index value. $T_A$ is in the range of 0~63. The UE side will calculate the latest TA adjustment value $N_{TA,new}$=$N_{TA,old}$ ($T_A$−31)×(the unit is $T_C$) according to adjustment value of the latest timing advance $N_{TA,old}$ and the received TA command, wherein $2^{\mu}$·15 kHz is the subcarrier spacing of the subsequent first uplink transmission.

In addition, since the propagation delay exists objectively, in order to overcome the propagation delay $N_{TAoffset}$, a transmission timing advance is pre-configured or defined according to the carrier frequency and the TDD or FDD system. The actual advance amount transmitted by the UE is ($N_{TA}$+$N_{TA\ offset}$)×$T_C$. Wherein the timing advance $N_{TAoffset}$ may also be configured to the UE through RRC (e.g., through the SIB). In the discussion herein, there is no discussion specific for $N_{TAoffset}$, but when performing the TA adjustment or propagation delay estimation, it may be performed based on additional $N_{TAoffset}$. Specifically, when calculating the propagation delay compensation for the TSN time, there are several methods for operation:

Method M: performing the propagation delay compensation according to $N_{TA}$ in the TA command. For example, the propagation delay $T_{delay}$=$N_{TA}$×$T_C$/2.

This method ignores the transmission timing advance configured by the system or the predetermined timing advance $N_{TAoffset}$ upon calculating the TSN time. It is considered that the predetermined advance $N_{TAoffset}$ is used to reserve enough time for uplink and downlink handover, and $N_{TA}$ indicated by the additional TA command is equal to the propagation delay estimated by the base station.

In addition, if additional compensation is required, the base station may adjust the time corresponding to the reference position information to compensate for the delay.

This method is only used for TSN time estimation and does not affect the adjustment of the TA, i.e., the UE still adjusts the TA for the uplink signal transmission based on ($N_{TA}$+$N_{TAoffset}$)×$T_C$.

Method N: performing the propagation delay compensation according to $N_{TA}$ in the TA command and the pre-configured or defined transmission timing advance $N_{TAoffset}$. For example, the UE assumes that the propagation delay $T_{delay}$=($N_{TA}$+$N_{TAoffset}$)×$T_C$/2.

This method takes into account the predetermined transmission timing advance $N_{TAoffset}$, and the estimated propagation delay is the actual value. The purpose of the base station adjusting the TA is to align the uplink and downlink transmission time.

Method P: performing the propagation delay compensation according to $N_{TA}$ in the TA command, the pre-configured or defined transmission timing advance $N_{TAoffset}$, and the additional interval $T_g$. For example, $T_{delay}$=($N_{TA}$+$N_{TAoffset}$)×$T_C$/2+$T_g$. This method takes into account that the TA adjustment command actually transmitted by the base station to the UE does not necessarily require strict alignment for uplink and downlink time. For example, for a TDD system, the base station needs time for an uplink and downlink handover. Then, the base station may pre-define or configure an additional interval $T_g$ for the UE to adjust the time difference between the uplink signal and the downlink signal after adjusting the actual TA command.

This method is only used for TSN time estimation and does not affect the adjustment of the TA, i.e., the UE still adjusts the TA for the uplink signal transmission based on ($N_{TA}$+$N_{TAoffset}$)×$T_C$.

Method Q: performing the propagation delay compensation according to $N_{TA}$ in the TA command and the additional interval $T_g$. For example, $T_{delay}$=$N_{TA}$×$T_C$/2+$T_g$.

Similar to method P, method Q does not consider the effect of the predetermined timing advance on that the UE performs the time estimation, and is applied to the case that the predetermined timing advance $N_{TAoffset}$ is 0 or the base station adjust the time corresponding to the reference position information to compensate for the delay.

The above four methods can be implemented by (optionally) configuring some parameters by the base station. For example, if the base station does not configure the uplink and downlink time interval $T_g$, method Q is equivalent to method M.

In addition, for the method of additionally introducing a dedicated signaling for compensating the propagation delay which is different from the TA command, it is not necessary to specifically process the timing advance.

Figure 6:
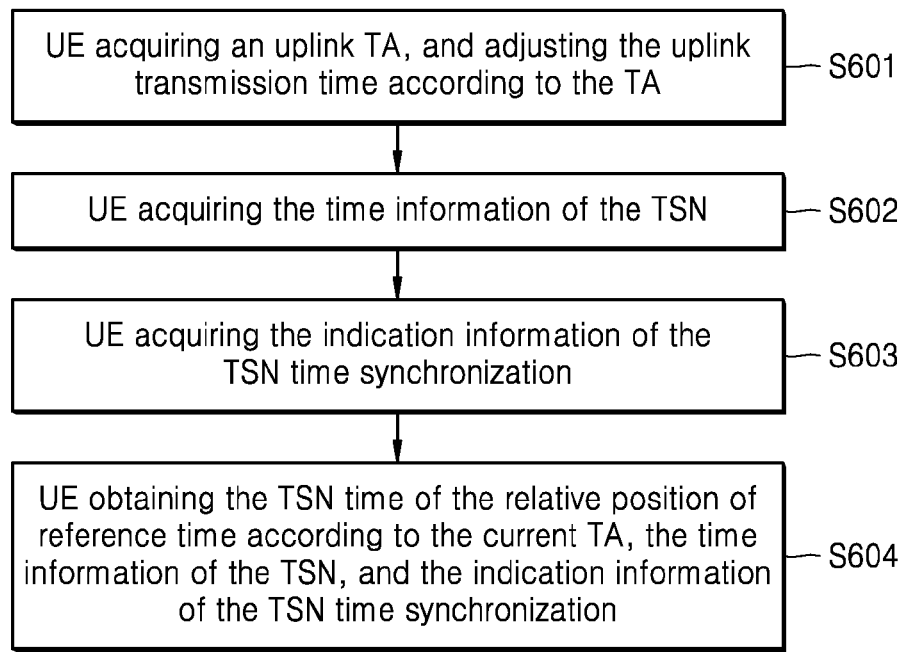
FIG. 6 is a schematic flowchart of introducing a new signaling on a basis of a TA to indicate a finer value for TSN time synchronization provided by an embodiment of the present application.

If the timing error (such as hardware-induced transmission error, estimation error, etc.) that other factors may introduce is considered, the granularity of the TA command of the existing NR is difficult to meet the requirement for the TSN time synchronization (the time error between the UEs is <1 μs, i.e., the time error between the UE and the base station is <0.5 μs). In order to improve the accuracy of the TSN time synchronization, for the method A, the present application provides the following methods to adjust the TSN time according to the propagation delay:

Method 1: introducing a new signaling on the basis of the TA to indicate a finer value for the TSN time synchronization. Specifically, the method is shown as in FIG. 6:

FIG. 6 is a schematic flowchart of introducing a new signaling on a basis of a TA to indicate a finer value for TSN time synchronization provided by an embodiment of the present application.

Step S601: the UE acquiring an uplink TA, and adjusting the uplink transmission time according to the TA.

Specifically, the UE may acquire the uplink TA through the random access procedure, or obtain the uplink TA in the connection state after acquiring the uplink TA in the random access procedure. In the NR and LTE systems, the TA is given by an MAC CE.

Step S602: the UE acquiring the Time information of the TSN, wherein the Time information of the TSN includes at least one of the following information: the TSN time, the TSN time uncertainty, and the relative position of the reference time corresponding to the TSN time.

Specifically, the base station transmits the time in the wireless communication system or the time of the TSN network to the UE. According to different TSN synchronization methods, the wireless communication system may be required to perform time synchronization with the external TSN network, or only transmit the time of the TSN network to the UE through the upper layer without strict synchronization with the wireless communication system.

Step S603: the UE acquiring the indication information of TSN time synchronization, wherein the indication information indicates time information to be further adjusted based on the current TA.

Specifically, there is no need to further adjust the uplink transmission time, and only the TSN time is adjusted. In Step S603, the fine adjustment is further performed based on the current TA. In different states, the current TA may be the uplink TA acquired through the random access procedure, or the uplink TA acquired through the random access procedure and the uplink TA acquired through the connection state. Alternatively, the indication information of the TSN time synchronization may be the TA information. The base station may indicate, by additional indication information (for example, to indicate by the RRC, or together with the MAC signaling of the TA in the MAC, or indirectly according to the granularity of the TA and/or the number of bits of the TA), whether the Ta information may be available for the TSN time synchronization, to the UE.

The UE may obtain the indication information of the TSN time synchronization by using RRC signaling, a MAC command, or a physical layer indication.

Step S604: the UE obtaining the TSN time of the relative position of the reference time according to the current TA, the Time information of the TSN, and the indication information of the TSN time synchronization.

Wherein, according to the TSN time uncertainty, the UE may discard some useless bits (undefined bits) when calculating the final TSN time, to improve the estimation accuracy.

In actual systems, the above steps may be different. For example, step S601 and step S602 may be different, or the adjustment of the uplink transmission time according to the TA in step S601 may occur after step S602 or step S603.

Furthermore, before step S603, the UE may transmit a request for the TSN time synchronization to the base station. Alternatively, the base station may obtain, according to the information of the UE, whether the UE needs to acquire the TSN time synchronization information from the core network, and then determine whether to transmit the indication information of the TSN time synchronization to the UE. Further, the above step S601 is not an essential step and may be omitted.

Figure 7:
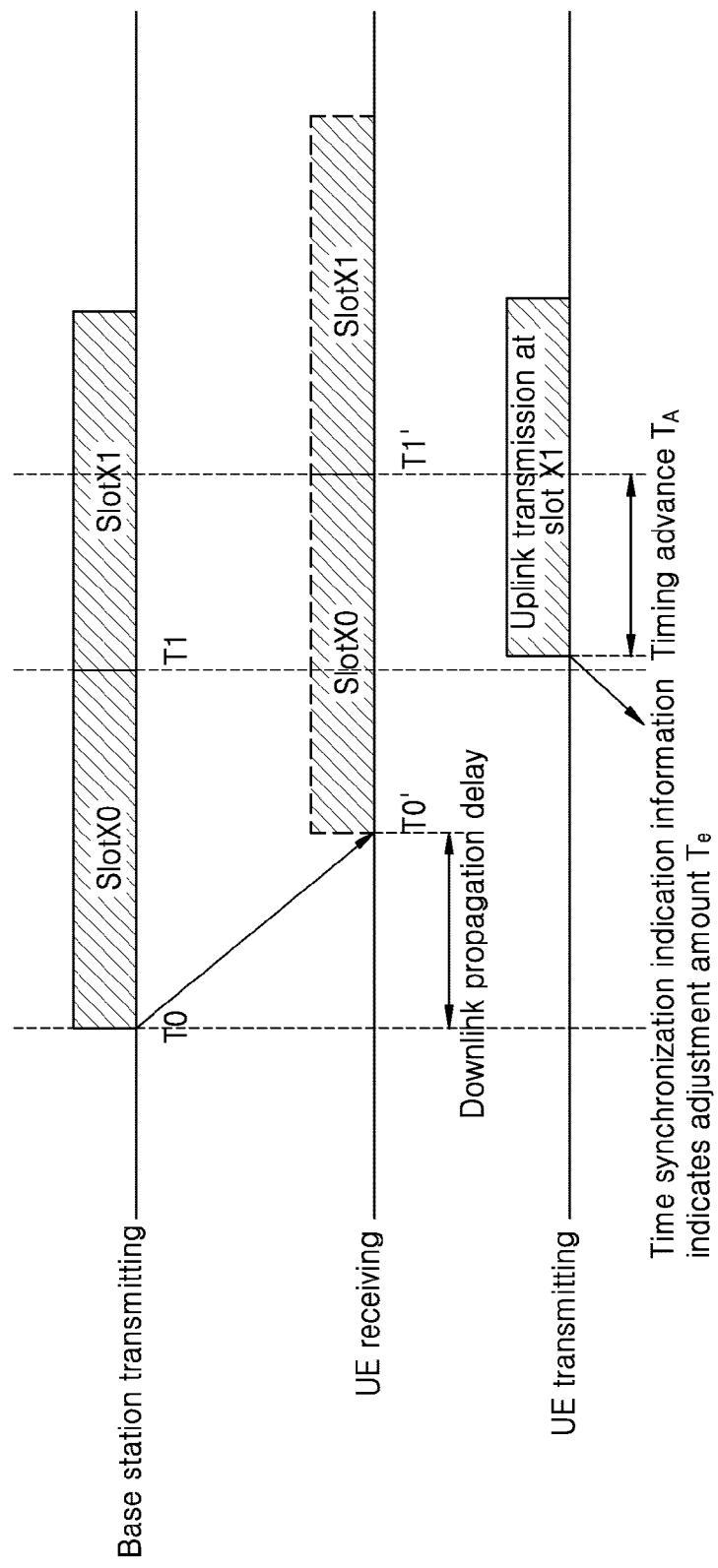
FIG. 7 is a schematic flowchart of a UE adjusting timing advance provided by an embodiment of the present application.

FIG. 7 is a method for the UE to adjust the timing advance. As shown in FIG. 7, the UE acquires the uplink TA as $T_A$. The UE receives the uplink grant of the base station, and instructs the UE to transmit the uplink channel in the slot X1. Therefore, the UE begins to perform the uplink transmission from $T_A$ time before slot X1. The UE further obtains the indication information of the TSN time synchronization, indicating that the adjustment amount is $T_e$. Then, the UE considers that the time T1 of the slot X1 considered by the base station is the time T1'-$T_A$-$T_e$ of the slot X1 considered by the UE. Therefore, the time of the base station may be correctly understood. Furthermore, the actual position of the reference time corresponding to the TSN time indicated by the base station may be correctly understood.

Figure 8:
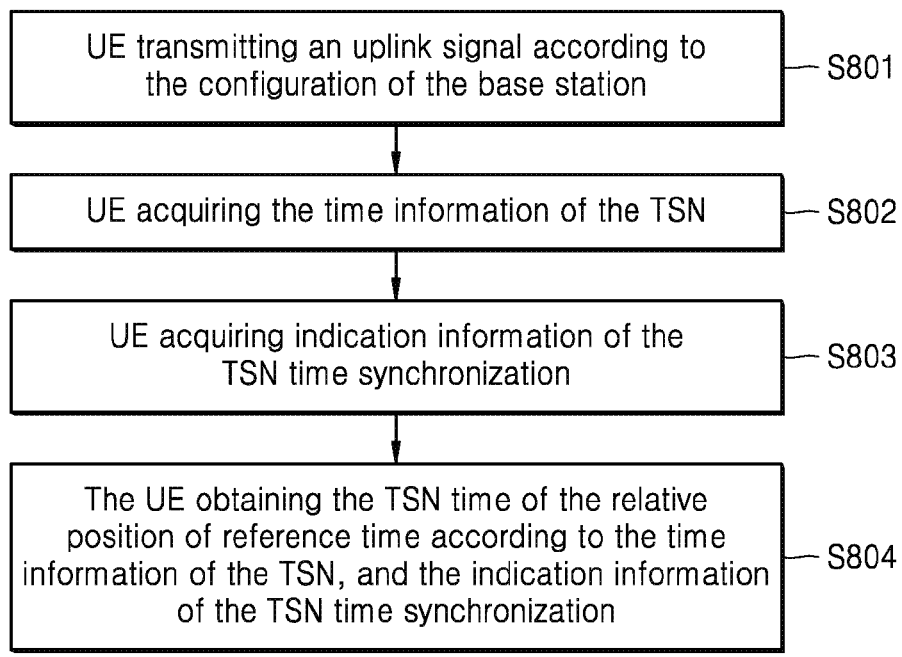
FIG. 8 is a schematic flowchart diagram of introducing a new signaling for TSN time synchronization with high accuracy provided by an embodiment of the present application.

Method 2: introducing a new signaling for high-accuracy TSN time synchronization. The signaling may also be applied to the adjustment of the TA, that is, the TA signaling with higher accuracy. Specifically, the method is shown as in FIG. 8:

FIG. 8 is a schematic flowchart diagram of introducing a new signaling for TSN time synchronization with high accuracy provided by an embodiment of the present application.

Step S801: the UE transmitting the uplink signal according to the configuration of the base station.

Step S802: the UE acquiring the Time information of the TSN, wherein the Time information of the TSN includes at least one of the following information: the TSN time, the TSN time uncertainty, and the relative position of the reference time corresponding to the TSN time.

Step S803: the UE acquiring the indication information of the TSN time synchronization, wherein the indication information indicates the offset (i.e., the propagation delay) between the relative position of the downlink time reference time received by the UE and the relative position of the downlink time reference time transmitted by the actual base station.

Step S804: the UE obtaining the TSN time of the relative position of the reference time according to the Time information of the TSN and the indication information of the TSN time synchronization.

The order of the above steps may be reversed. For example, step S802 and step S803 may be interchanged or may occur simultaneously. Furthermore, before step S803, the UE may transmit a request for TSN time synchronization to the base station. Alternatively, the base station may obtain, according to the information of the UE, whether the UE needs to acquire the TSN time synchronization information from the core network, and then determine whether to transmit the indication information of the TSN time synchronization to the UE. Further, the above step S801 is not an essential step and may be omitted. The main purpose of transmitting the uplink signal is for the base station to estimate the propagation delay. In an example, the uplink signal may be one or more of a PRACH, an SRS, an uplink reference signal, a PUSCH, a PUCCH, and the like.

Figure 9A:
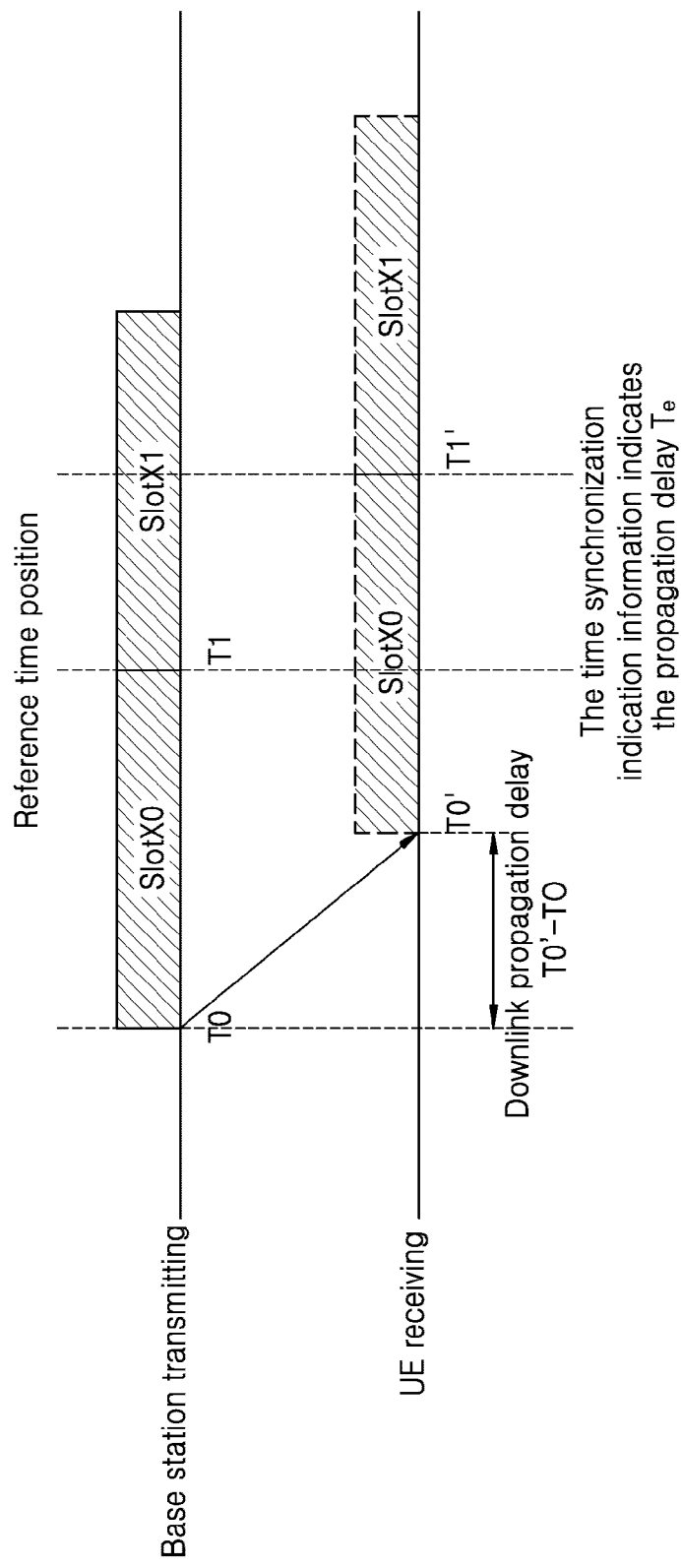
FIG. 9a is schematic diagram of TA adjustment provided by an embodiment of the present application.

FIG. 9a is schematic diagram of TA adjustment provided by an embodiment of the present application.

As shown in FIG. 9a, the base station transmits the TSN time T1 to the UE, of which the reference time position is the end position of the slot X0. The UE obtains the end position of the slot X0 as T1' according to the received downlink channel. The base station additionally transmits the indication information of the TSN time synchronization to the UE, wherein the indication information indicates the offset amount Te of the relative position of the downlink time reference time received by the UE and the relative position of the downlink time reference time transmitted by the actual base station. Then the UE obtains the actual reference position of the TSN time, as T1, according to the end position T1' of the slot X0, that is, the UE obtains the correct TSN time.

This method may introduce a new method for the time synchronization of TSN to correct the propagation delay, which is independently of the existing TA. This method may also be considered as a set of methods for providing a finer TA adjustment, that is, the UE may perform TA adjustment according to the offset amount Te of the relative position of the reference time of the downlink time and the actual relative position of the reference time of the downlink time transmitted by the base station. It is also possible to completely reuse the granularity of the existing TA. At this time, the base station may indicate to the UE whether the finer information is available to be used for the TSN time synchronization, by additional indication information (for example, to indicate by the RRC, or together with the MAC signaling of the TA in the MAC, or indirectly according to the granularity of the TA and/or the number of bits of the TA).

Figure 9B:
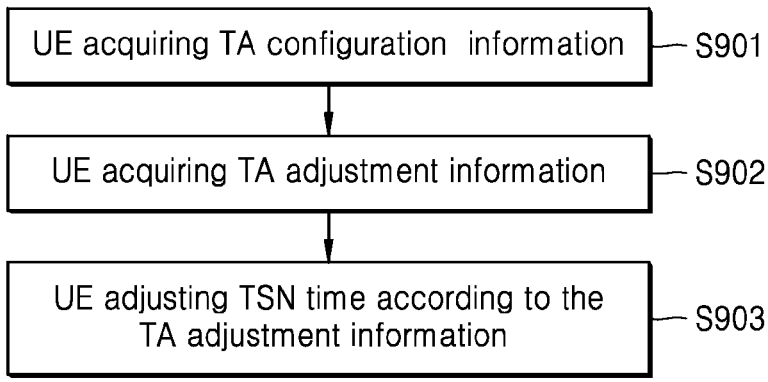
FIG. 9b is schematic flowchart of TA adjustment provided by an embodiment of the present application.

FIG. 9b is schematic flowchart of TA adjustment provided by an embodiment of the present application.

Specifically, as shown in FIG. 9b, the steps of the method for adjusting the TSN time synchronization according to the TA information are as follows:

Step S901: the UE acquires TA configuration information.

For example, the UE acquires the accuracy of the TA signaling, the number of bits, and whether the TSN time may be adjusted according to the TA signaling. In addition, the TA configuration information further includes the TA configuration information in the RAR, and/or the TA configuration information of the connection state.

Step S902: the UE acquires TA adjustment information.

The TA adjustment information includes the MAC signaling in the RAR and/or the MAC signaling in the connection state.

Step 5903: the UE adjusts the TSN time according to the TA adjustment information.

Further, step 5903 includes: the UE determining, according to the TA configuration information, whether it is necessary to adjust the TSN time according to the TA adjustment information. Specifically, the UE determines whether to determine the TSN synchronization time and/or the adjusting TSN time according to the TA adjustment information, according to the indication (whether is capable of calibration TSN time according to the TA signaling) in the TA configuration information.

In addition, the UE may determine, whether to perform synchronization and/or adjustment of the TSN time according to the indication information of TSN time synchronization in the other examples herein, or according to the TA adjustment information, based on at least one of the following:

The drift granularity of the UE clock;

whether the last TSN time synchronization and/or the time of the adjustment to the current time exceed(s) a certain threshold;

the adjustment step indicated by the indication information of the TA adjustment information or the TSN time synchronization;

whether the UE transmits the TSN synchronization request to the base station;

the high layer indication within the UE;

whether the UE needs to perform the TSN time synchronization.

Specifically, if the granularity of the UE clock is high, the drift will not occur within a certain period of time, and then there is no need to compensate the propagation delay according to the TA information in real-time.

For the method of the adjustment step indicated by the TA adjustment information or the indication information of the TSN time synchronization, specifically, when the adjustment step of the TA adjustment information transmitted by the base station is greater than a certain value, the TA adjustment is performed, and otherwise, the TA adjustment is not performed. The reason is that an additional error is introduced due to each time adjustment, and if the additional introduced error is greater than the adjustment step, the error caused by the adjustment is greater than that without adjustment. Alternatively, the UE may decide, according to the accumulated number of current TA, whether to compensate the propagation delay according to the current accumulated TA information. Specifically, if the accumulated number of TA is too much, the propagation delay is not compensated according to the current accumulated TA information, and otherwise, the compensation is performed. Or, the UE decides whether to compensate the propagation delay according to the uncertainty of the TSN time information. For example, if the value of the propagation delay is less than the uncertainty of the time information, then it is not necessary to perform the compensation. Otherwise, the time error will increase if the compensation is performed.

The above methods of determining whether to perform TSN time synchronization and/or adjustment based on TA adjustment information are applicable to the above method 1 and method 2.

In addition, the UE only needs to perform propagation delay when TSN time synchronization is required. Then, the UE may transmit a PRACH to the base station or the RRC, to request the base station to transmit new TSN time synchronization indication information with higher accuracy (including high-accuracy TA information, or a new indication information). Optionally, the UE may select a PRACH resource for the high-accuracy TA according to the pre-configuration (if the base station configures a PRACH resource corresponding to a high-accuracy TA). The UE will receive a value indicated by the timing advance command $T_A$ in the RAR. The UE calculates the TA and the propagation delay according to this indication value and the corresponding TA granularity.

Optionally, the UE transmits a propagation delay request to the base station. The request may be an RRC, a MAC, or a physical layer (e.g., using a specific PRACH resource, an SR resource, an SRS resource, etc.). Subsequently, the UE waits for the TA adjustment information transmitted by the base station to the UE. The TA adjustment information may be adjustment information relative to the downlink reference signal, or the further adjustment on the basis of the adjustment value $N_{TA,old}$ with respect to the latest TA. Optionally, the base station may indicate one of the two.

Optionally, the UE may perform synchronization of the TSN time according to the accumulated TA adjustment information and the Time information of the TSN obtained from the base station. The accumulated TA adjustment information is the TA adjustment information accumulated from the last random access of the UE. Specifically, the UE calculates the latest TA adjustment value $N_{TA,new}=N_{TA,old}+(T_A·31)·16·64/2^\mu$ (the unit is $T_C$), according to the adjustment value of the latest timing advance $N_{TA,old}$ and the received TA command, wherein, $2^\mu·15$ kHz is the subcarrier spacing of the most recent uplink transmission. If the corresponding granularity in the corresponding TA command changes, $16·64/2^\mu$ may be replaced with the corresponding new granularity. If the corresponding number of bits in the corresponding TA command changes, the value corresponding to $(T_A-31)$ may be modified. The UE may consider the propagation delay to be approximately TA/2.

Figure 10:
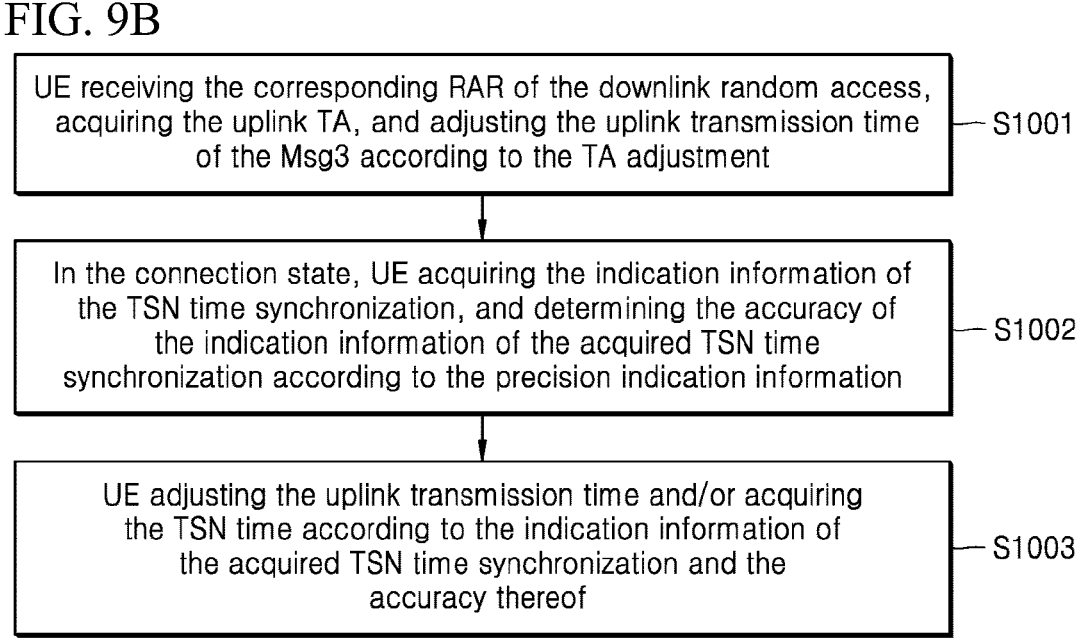
FIG. 10 is a schematic diagram of high-accuracy TA adjustment provided by an embodiment of the present application.

FIG. 10 is a schematic diagram of high-accuracy TA adjustment provided by an embodiment of the present application.

In another example, as shown in FIG. 10, the high-accuracy TA adjustment method includes the following steps:

Step S1001: the UE receiving the corresponding RAR of the downlink random access, acquiring the uplink TA, and adjusting the uplink transmission time of the Msg3 according to the TA adjustment.

Step S1002: in the connection state, the UE acquiring the indication information of the TSN time synchronization, and determining the granularity of the indication information of the acquired TSN time synchronization according to the granularity indication information.

Step S1003: the UE adjusting the uplink transmission time and/or acquiring the TSN time according to the indication information of the acquired TSN time synchronization and its granularity.

Wherein, a new MAC CE may be designed to indicate the indication information of the TSN time synchronization, which may be 8 bits or 16 bits (or may provide higher granularity). The MAC CE of the existing TA may also be reused by the identifier in the MAC CE, and the DCI format and/or parameters used to schedule the PDSCH carrying the MAC CE may also be reused, to indicate the granularity thereof. The granularity may also be directly configured through the RRC signaling.

In addition, in step S1001, the granularity in the uplink TA acquired by the UE may be an existing granularity or a newly defined granularity. If it is a newly defined granularity, the base station may configure a specific PRACH resource for a contention or non-contention random access request for the UE. If the UE selects the specific resource, the corresponding uplink TA granularity in the RAR is the newly defined granularity, and otherwise it is the existing granularity.

Further, step S1001 may be omitted. In the connection mode, the UE may directly obtain the indication information of the TSN time synchronization, and obtain the TSN time according to the indication information and the corresponding granularity.

For the method 1 and method 2 and the high-accuracy TA adjustment method described above, the corresponding granularity corresponding to each index value $T_{TSN}$ of the indication information of the TSN time synchronization, i.e., the time unit or granularity, may be pre-defined in the protocol, or directly configured by the base station, or inferred from other parameters. The number of bits of the indication information for the TSN time synchronization may be prescribed in the protocol, or may be directly configured by the base station, or inferred by other parameters.

Specifically, for the time unit corresponding to each index value $T_{TSN}$, at least one of the following methods may be included:

pre-defined in the protocol:

specifically, the time unit corresponding to each index value $T_{TSN}$ is prescribed as $64T_C$ (0.0325 μs).

Direct configuration through the base station:

Specifically, the base station may configure the UE to change the granularity through the RRC signaling. Specifically, four values $\{8T_C, 16T_C, 32T_C, 64T_C\}$ may be configured through 2 bits RRC signaling.

Other parameters are inferred:

Specifically, that is as any of the following methods:

according to the corresponding time unit of the current TA (that is, the corresponding uplink subcarrier spacing when the TA was last adjusted);

according to the subcarrier spacing of the next uplink transmission (i.e., a method similar to the TA adjustment).

For the above two methods, the granularity of the fine adjustment is smaller than that of the TA adjustment. Specifically, $N_{TSN}=T_{TSN}·64/2^\mu$. At this time, the granularity is improved to 1/64, with respect to the TA adjustment. In the NR system, one UE has a plurality of activated uplink bandwidth parts (BWPs), wherein each of the different activated BWPs is on a different uplink carrier, and the indication information for determining the TSN time synchronization is determined according to the maximum uplink subcarrier spacing or is determined according to a subcarrier spacing indicated by the base station to the UE.

The time unit corresponding to each index value $T_{TSN}$ is determined according to the cell radius or the PRACH format.

The cell radius may be obtained according to the format of the PRACH, or directly indicated by RRC signaling. Specifically, for example, different PR lengths of the PRACH are used to counter propagation delays of different cell radii, and different PRACH lengths may correspond to different granularities.

The time unit corresponding to each index value $T_{TSN}$ is determined according to the format of the uplink transmission signal for measurement used by the base station.

Since the bandwidth of the uplink signal transmission and the sampling frequency is determined by the base station measuring the propagation delay, when the uplink signal transmission bandwidth and/or the sampling frequency is large, the relatively accurate propagation delay estimation may be obtained; conversely, when the uplink signal transmission bandwidth and/or the sampling frequency is small, the granularity angle of the propagation delay estimation may be obtained. Therefore, the relationship of the parameter of the uplink transmission signal and the time unit corresponding to each index value $T_{TSN}$ may be defined in advance. When the base station configures the UE (or the UE selects a parameter of the uplink signal, such as PRACH), the time unit corresponding to each index value $T_{TSN}$.

Optionally, the error of the base station to measure the propagation delay is also determined by the signal used by the UE for synchronization, specifically, including the parameters of the Synchronization Signal Block (SSB), such as the subcarrier spacing, the occupied bandwidth, and the like. Therefore, its time unit may also be determined according to the parameters of the SSB.

Optionally, in order to reduce overhead and improve accuracy, it may be indicated in a two-stage manner. Specifically, two index values. $T_{TSN1}$ and index value $T_{TSN2}$ may be designed. The granularity of the two index values is different, the first one representing a coarse adjustment and the second representing a fine adjustment.

Figure 11:
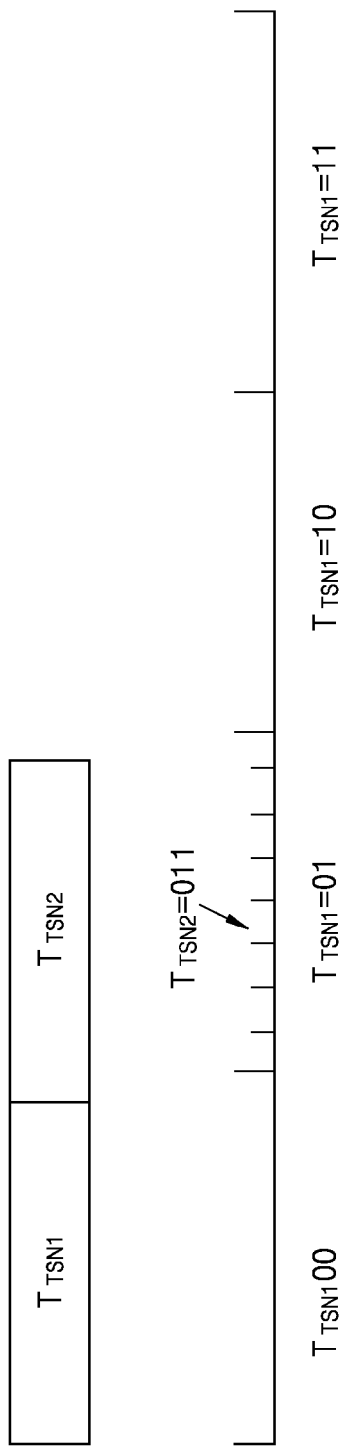
FIG. 11 is a schematic flowchart of improving accuracy indicated by two-order mode provided by an embodiment of the present application.

FIG. 11 is a schematic flowchart of improving accuracy indicated by two-order mode provided by an embodiment of the present application.

As shown in FIG. 11, $T_{TSN1}$ is 2 bits, $T_{TSN2}$ is 3 bits; $T_{TSN1}$=01 is the second index for coarse granularity, and $T_{TSN2}$=011 is 4 indexes for fine granularity. Optionally, the first index value may be the same as the time unit corresponding to the index value of the current TA, as $16 \cdot 64/2^\mu T_C$, and, the second index corresponds to a smaller time unit, as $2 \cdot 64/2^\mu T_C$. Then, when $T_{TSN1}$=01 and $T_{TSN2}$=011 Time, $N_{TA}=T_{TSN1} \cdot 16 \cdot 64/2^\mu + T_{TSN2} \cdot 2 \cdot 64/2^\mu = 1 \cdot 16 \cdot 64/2^\mu + 3 \cdot 2 \cdot 64/2^\mu = 22 \cdot 64/2^\mu$, wherein the time unit is $T_C$.

These two index values may be given in different steps, for example, method one. Or the two index values may be given in the same RRC message or MAC layer indication (such as MAC CE) or physical layer signaling. In addition, the first index value may be used for the adjustment of the TA, and the second index value is only used for the adjustment of the TSN time. Because, when the UE actually performs the uplink transmission, some transmission errors are also introduced due to hardware, and these errors may be greater than the time unit corresponding to the second index value. Therefore, it is not necessary to perform too fine adjustment of the TA.

Optionally, for the foregoing method 1 and method 2, in order to ensure that the accuracy of the TSN synchronization requirement may be met, the number of bits of the indication information of the TSN time synchronization that may be required for different situations is different. Specifically, since the estimation of the TA and the adjustment accuracy may depend on the parameters of the uplink transmission signal and/or the parameters of the SSB, then, for different configuration parameters, the number of bits required may be different in order to achieve the same accuracy requirement of TSN time synchronization.

Therefore, the number of bits required for the indication information of the TSN time synchronization may be pre-defined in the protocol, or directly configured by the base station, or inferred by other parameters. Specifically, at least one of the following methods is included:

the number of bits is predefined in the protocol;

the X bit indication as predefined in the protocol;

directly configuring the number of bits by the RRC signaling;

one of the number of bits {2 bits, 4 bits, 6 bits, 8 bits} as the base station configures to the UE;

determining the number of bits according to the cell radius or the PRACH format;

When the cell radius is large, the range of propagation delay is large. Therefore, more bits are used to obtain the required accuracy of TSN time synchronization. When the cell radius is small, the range of propagation delay is small, and the time synchronization accuracy required by the TSN network may be obtained without too many bits.

The number of bits is determined according to at least one of the following: the subcarrier spacing and/or bandwidth of the uplink transmission signal, the subcarrier spacing and/or bandwidth of the current cell SSB, and the downlink subcarrier spacing and/or bandwidth of the current BWP.

Specifically, the correspondence between at least one of the following parameters and the number of bits may be defined: the subcarrier spacing and/or the bandwidth of the uplink transmission signal being used to measure the propagation delay, and the uplink subcarrier spacing be used to determine the current TA granularity, the uplink subcarrier spacing to be transmitted next time, the subcarrier spacing and/or the bandwidth of the current cell SSB, and the downlink subcarrier spacing and/or the bandwidth of the current BWP. In an NR system, a UE may have a plurality of active uplink and/or downlink bandwidth parts (BWPs), wherein each different activated BWP is on a different uplink and/or downlink carrier. the number of bits for determining the indication information of the TSN time synchronization is determined according to the maximum uplink subcarrier spacing therein, or the base station may indicate to the UE which subcarrier spacing.

Optionally, for step S1001 in the foregoing method, the granularity of the TA in the RAR may be directly improved. Considering backward compatibility, the granularity of the TA in the RAR corresponding to the random access procedure triggered by the PDCCH may be modified only. When the PDCCH is triggered, the base station may configure the accuracy for the UE. For example, the different granularities of the TAs in the RAR is indicated through different DCI formats, RNTIs, or introducing a new amount in the reserved bit information of the DCI used to trigger the random access procedure. Alternatively, the accuracy of the TA may be indicated in the RAR replied by the base station, for example, by using an unused RAR header, a reserved bit in the RAR, etc.

Optionally, for Step S801 in method 2, the uplink transmitting signal is at least one of the following: Physical Random Access Channel (PRACH), a Sounding Reference Signal (SRS), a reference signal for measuring the propagation delay, and a Demodulation Reference Signaling (DMRS) of the user, a Physical Uplink Shared Channel (PUSCH) and a Physical Uplink Control Channel (PUCCH).

Optionally, for method 1 and method B, the base station also needs to measure the uplink transmission signal to estimate the propagation delay.

Embodiment 4

Based on the inventive concept consistent with Embodiment 1 and Embodiment 3, the embodiment of the present application further provides a UE.

Figure 12:
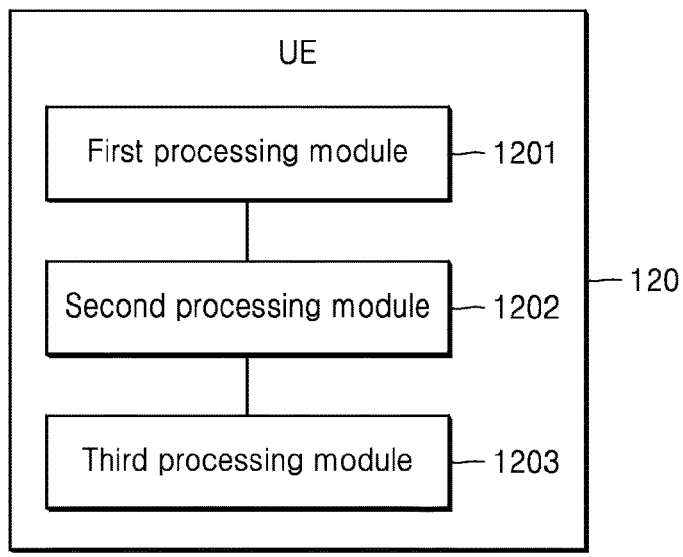
FIG. 12 is a schematic structural diagram of a UE provided by an embodiment of the present application.

FIG. 12 is a schematic structural diagram of a UE provided by an embodiment of the present application.

The schematic diagram of the structure of the UE is as shown in FIG. 12, and the UE 120 includes a first processing module 1201, a second processing module 1202, and a third processing module 1203.

The first processing module 1201 is configured to receive indication information, wherein the indication information be used for indicating propagation delay between the UE and a base station and/or time information of a time sensitive network (TSN);

the second processing module 1202 is configured to determine time granularity of one bit of the indication information;

the third processing module 1203 is configured to perform TSN time synchronization according to the indication information and the time granularity of one bit of the indication information.

Optionally, the third processing module 1203 is configured to determine a rough time offset according to receiving a timing advance command transmitted by the base station, perform fine time offset according to the indication information and the time granularity of one bit of the indication information, and perform the TSN time synchronization according to the rough time offset and the fine time offset.

Optionally, the third processing module 1203 is configured to adjust uplink transmission time according to the indication information and the time granularity of one bit of the indication information.

Optionally, the third processing module 1203 is configured to adjust uplink transmission time according to the indication information and the time granularity of one bit of the indication information, including at least one of the following:

optionally, the third processing module 1203 is specifically configured to obtain a propagation delay according to the indication information and the time granularity of one bit of the indication information, and compensate the propagation delay as an uplink transmission time based on downlink transmission time;

optionally, the third processing module 1203 is specifically configured to obtain the propagation delay according to the indication information and the time granularity of one bit of the indication information, and additionally compensate the propagation delay as the uplink transmission time based on the current uplink transmission time.

Optionally, the indication information includes at least one of the following:

time uncertainty information; TSN clock time information; reference time domain position corresponding to the TSN clock time information.

Optionally, the Time information of the TSN includes at least one of the following:

propagation delay information between the UE and the base station and time information of the TSN;

the time information of the TSN after compensation of propagation delay between the UE and the base station by the base station.

Optionally, before receiving the indication information, the first processing module 1201 is further configured to transmit the uplink signal, wherein the uplink signal includes at least one of the following: a physical random access channel (PRACH), a sounding reference signal (SRS), a reference signal for measuring the propagation delay, and a demodulation reference signaling, a physical uplink shared channel and a physical uplink control channel.

Optionally, the second processing module 1202 is specifically configured to determine the time granularity of one bit of the indication information, including at least one of: determining the time granularity of one bit of the indication information according to pre-defined time granularity; directly configuring the time granularity according to a radio resource control (RRC) signaling to determine the time granularity of one bit of the indication information; determining the time granularity of one bit of the indication information according to a cell radius; determining the time granularity of one bit of the indication information according to a PRACH format; determining the time granularity of one bit of the indication information according to the subcarrier spacing for uplink transmission; determining the time granularity of one bit of the indication information according to the format of an uplink transmission signal measured by the base station; and determining the time granularity of one bit of the indication information according to the timing advance command.

Optionally, the second processing module 1202 is further configured to determine the number of bits of the indication information, wherein the determining the number of bits of the indication information, includes at least one of the following: determining the number of bits according to pre-set number of bits; determining the number of bits according to the configured number of bits by the RRC signaling directly; determining the number of bits according to the cell radius; determining the number of bits according to the PRACH format; determining the number of bits according to the subcarrier spacing of the uplink transmission signal; determining the number of bits according to a subcarrier spacing of a synchronization signal block (SSB) of the current base station; determining the number of bits according to the downlink subcarrier spacing of the current bandwidth part (BWP).

For the content that is not detailed in the UE provided by the embodiment of the present application, it may be referred to the foregoing time synchronization methods. The beneficial effects that the UE may provide are the same as the time synchronization methods described above, of which details are not described herein again.

Embodiment 5

Figure 13:
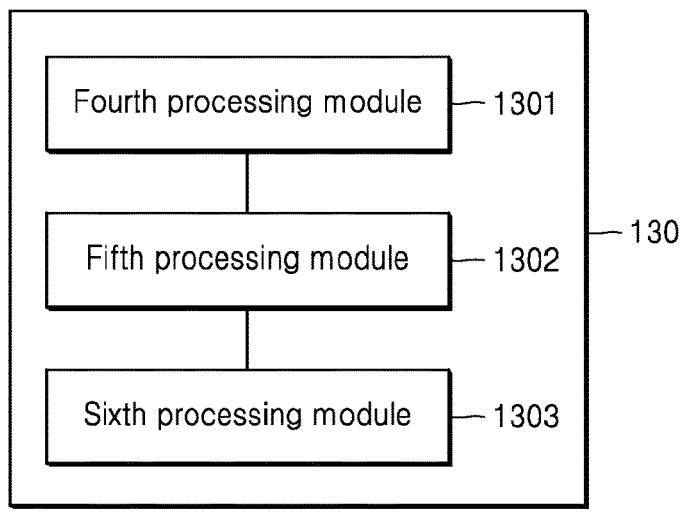
FIG. 13 is a schematic structural diagram of a base station provided by an embodiment of the present application.

FIG. 13 is a schematic structural diagram of a base station provided by an embodiment of the present application.

Based on the inventive concept consistent with Embodiment 2 and Embodiment 3, the embodiment of the present application further provides a base station, and the structure of the base station 130 is shown in FIG. 13, including a fourth processing module 1301, a fifth processing module 1302, and a sixth processing module 1303.

The fourth processing module 1301 is configured to receive an uplink transmission signal of at least one UE;

the fifth processing module 1302 is configured to estimate a propagation delay of each UE according to the uplink transmission signal;

the sixth processing module 1303 is configured to transmit corresponding indication information to each UE according to the propagation delay of each UE, the indication information being used to indicate propagation delay between each UE and the base station and/or the time information of the TSN.

Optionally, the indication information includes at least one the following: the information indicating the propagation delay, the clock time information of the TSN after compensating the propagation delay, the information for adjusting the uplink transmission advance, the time uncertainty, and the reference time domain position corresponding to the clock time information.

Optionally, the manner of configuring the indication information includes at least one of: configuring according to RRC signaling; configuring according to a MAC layer instruction; and configuring according to physical layer indication.

For the content that is not described in detail in the base station provided by the embodiment of the present application, it may be referred to the time synchronization methods. The beneficial effects that the base station provided by the embodiment of the present application may achieve are the same as the foregoing time synchronization methods, of which details are not described herein again.

Embodiment 6

Figure 14:
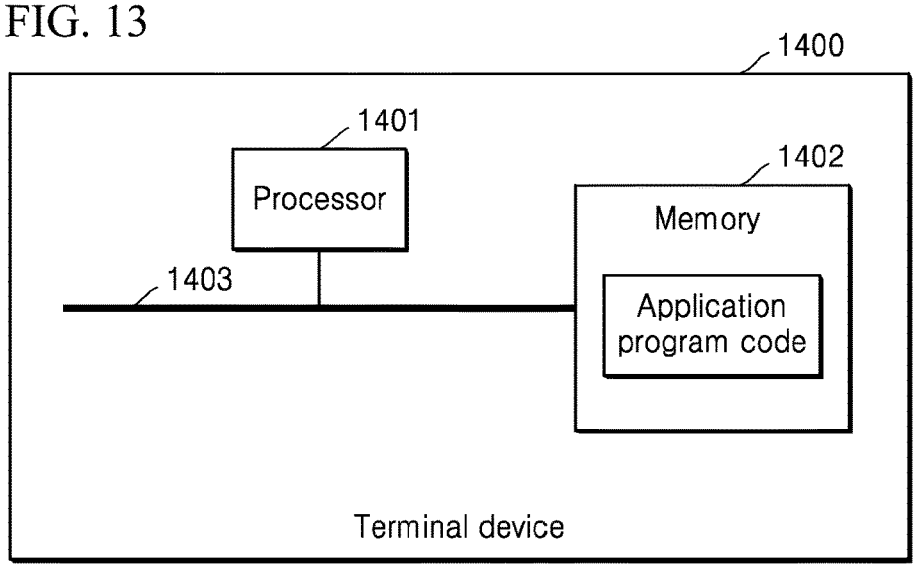
FIG. 14 is a schematic structural diagram of a terminal device provided by an embodiment of the present application.

FIG. 14 is a schematic structural diagram of a terminal device provided by an embodiment of the present application.

Based on the inventive concept consistent with Embodiment 1 and Embodiment 3, the embodiment of the present application further provides a terminal device, and the schematic structure of the terminal device 1400 is shown in FIG. 14, including at least one processor 1401, a memory 1402, and a bus 1403, at least one processor 1401 being electrically coupled to the memory 1402; the memory 1402 is configured to store at least one computer executable instruction, and the processor 1401 is configured to execute the at least one computer executable instruction to perform steps of any one of the time synchronization methods provided by any of Embodiment 1 and Embodiment 3 or any of the optional implementation in the present application.

Further, the processor 1401 may be a Field-Programmable Gate Array (FPGA) or other devices with logic processing capabilities, such as a Microcontroller Unit (MCU), a Central Process Unit (CPU).

Embodiment 7

Figure 15:
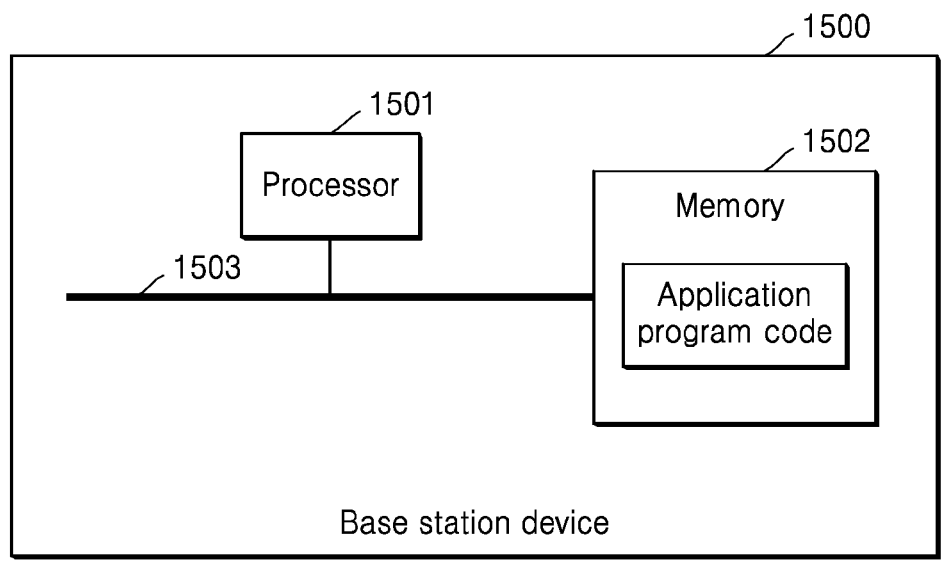
FIG. 15 is a schematic structural diagram of a base station device provided by an embodiment of the present application.

FIG. 15 is a schematic structural diagram of a base station device provided by an embodiment of the present application.

Based on the inventive concept consistent with Embodiment 2 and Embodiment 3, the embodiment of the present application further provides a base station, and the schematic structure of the base station 1500 is shown in FIG. 15, including at least one processor 1501, a memory 1502, and a bus. 1503, at least one processor 1501 being electrically coupled to the memory 1502; the memory 1502 is configured to store at least one computer executable instruction, and the processor 1501 is configured to execute the at least one computer executable instruction to perform steps of any one of the time synchronization methods provided by any of Embodiment 2 and Embodiment 3 or any of the optional implementation in the present application.

Further, the processor 1501 may be a Field-Programmable Gate Array (FPGA) or other devices with logic processing capabilities, such as a Microcontroller Unit (MCU), a Central Process Unit (CPU).

Embodiment 8

Based on the inventive concept consistent with Embodiment 1 and Embodiment 3, the embodiment of the present application further provides a computer readable storage medium, storing a computer program, wherein the computer program is used to implement steps of any one of the time synchronization methods provided by any of Embodiment 1 and Embodiment 3 or any of the optional implementation in the present application.

Embodiment 9

Based on the inventive concept consistent with Embodiment 2 and Embodiment 3, the embodiment of the present application further provides another computer readable storage medium, storing a computer program, wherein the computer program is used to implement steps of any one of the time synchronization methods provided by any of Embodiment 2 and Embodiment 3 or any of the optional implementation in the present application.

The computer readable storage medium provided by the embodiments of the present application includes, but is not limited to, any type of disk (including a floppy disk, a hard disk, an optical disk, a CD-ROM, and a magneto-optical disk), a Read-Only Memory (ROM), and a Random Access Memory (RAM), an Erasable Programmable Read-Only Memory (EPROM), an Electrically Erasable Programmable Read-Only Memory (EEPROM), a Flash Memory, a Magnetic Card or a light card. That is, the readable storage medium includes any medium that is stored or transmitted by a device (e.g., a computer) in a readable form.

Applying the embodiments of the present application has at least the following beneficial effects:

achieving more accurate time synchronization of a Time sensitive network (TSN). In addition, higher granularity uplink synchronization, that is, timing advance (TA) timing synchronization, may also be achieved.

Figure 16:
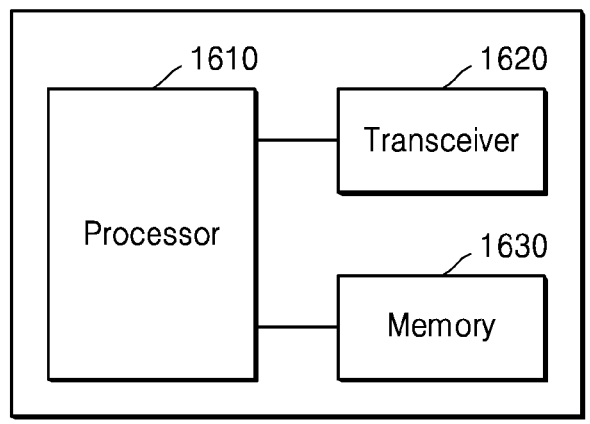
FIG. 16 schematically illustrates a Base station according to embodiments of the present disclosure.

FIG. 16 schematically illustrates a Base station according to embodiments of the present disclosure.

Referring to the FIG. 16, the Base station 1600 may include a processor 1610, a transceiver 1620 and a memory 1630. However, all of the illustrated components are not essential. The Base station 1600 may be implemented by more or less components than those illustrated in FIG. 16. In addition, the processor 1610 and the transceiver 1620 and the memory 1630 may be implemented as a single chip according to another embodiment.

The Base station 1600 may correspond to the base station 1500 of FIG. 15.

The aforementioned components will now be described in detail.

The processor 1610 may include one or more processors or other processing devices that control the proposed function, process, and/or method. Operation of the Base station 1600 may be implemented by the processor 1610.

The transceiver 1620 may include a RF transmitter for up-converting and amplifying a transmitted signal, and a RF receiver for down-converting a frequency of a received signal. However, according to another embodiment, the transceiver 1620 may be implemented by more or less components than those illustrated in components.

The transceiver 1620 may be connected to the processor 1610 and transmit and/or receive a signal. The signal may include control information and data. In addition, the transceiver 1620 may receive the signal through a wireless channel and output the signal to the processor 1610. The transceiver 1620 may transmit a signal output from the processor 1610 through the wireless channel.

The memory 1630 may store the control information or the data included in a signal obtained by the Base station 1600. The memory 1630 may be connected to the processor 1610 and store at least one instruction or a protocol or a parameter for the proposed function, process, and/or method. The memory 1630 may include read-only memory (ROM) and/or random access memory (RAM) and/or hard disk and/or CD-ROM and/or DVD and/or other storage devices.

In an exemplary embodiment, the processor 1610 configured to generate indication information related to a power control parameter set of a channel for transmitting data with a first priority and transmit the indication information to a User Equipment (UE).

Figure 17:
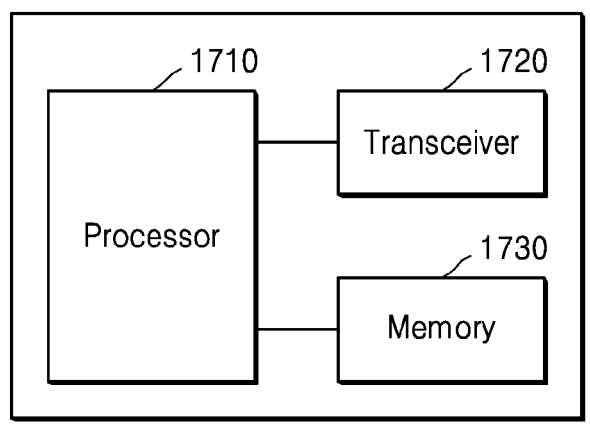
FIG. 17 illustrates a user equipment (UE) according to embodiments of the present disclosure.

FIG. 17 illustrates a user equipment (UE) according to embodiments of the present disclosure.

Referring to the FIG. 17, the UE 1700 may include a processor 1710, a transceiver 1720 and a memory 1730. However, all of the illustrated components are not essential. The UE 1700 may be implemented by more or less components than those illustrated in FIG. 17. In addition, the processor 1710 and the transceiver 1720 and the memory 1730 may be implemented as a single chip according to another embodiment.

The UE 1700 may correspond to the terminal device 1400 of FIG. 14.

The aforementioned components will now be described in detail.

The processor 1710 may include one or more processors or other processing devices that control the proposed function, process, and/or method. Operation of the UE 1700 may be implemented by the processor 1710.

The transceiver 1720 may include a RF transmitter for up-converting and amplifying a transmitted signal, and a RF receiver for down-converting a frequency of a received signal. However, according to another embodiment, the transceiver 1720 may be implemented by more or less components than those illustrated in components.

The transceiver 1720 may be connected to the processor 1710 and transmit and/or receive a signal. The signal may include control information and data. In addition, the transceiver 1720 may receive the signal through a wireless channel and output the signal to the processor 1710. The transceiver 1720 may transmit a signal output from the processor 1710 through the wireless channel.

The memory 1730 may store the control information or the data included in a signal obtained by the UE 1700. The memory 1730 may be connected to the processor 1710 and store at least one instruction or a protocol or a parameter for the proposed function, process, and/or method. The memory 1730 may include read-only memory (ROM) and/or random access memory (RAM) and/or hard disk and/or CD-ROM and/or DVD and/or other storage devices.

It may be understood by those skilled in the art that computer program instructions may be used to realize each block in structure diagrams and/or block diagrams and/or flowcharts as well as a combination of blocks in the structure diagrams and/or block diagrams and/or flowcharts. It may be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are performed by computers or other processors of programmable data processing means.

It may be understood by those skilled in the art that the operations, methods, steps in the flows, measures and solutions already discussed in the present application may be alternated, changed, combined or deleted. Further, the operations, methods, other steps in the flows, measures and solutions already discussed in the present application may also be alternated, changed, rearranged, decomposed, combined or deleted. Further, prior arts having the operations, methods, the steps in the flows, measures and solutions already discussed in the present application may also be alternated, changed, rearranged, decomposed, combined or deleted.

The above is only a part of the embodiments of the present application, and it should be noted that those skilled in the art may also make several improvements and re-touchings without departing from the principles of the present application. It should be considered as the scope of protection of the present application.

The invention claimed is:

1. A time synchronization method performed by a user equipment (UE) in a wireless communication system, the method comprising:

receiving, from a base station (BS), a message including information related to propagation delay compensation and reference time information including time uncertainty information;

receiving, from the BS, time difference information indicating a receiving and transmitting time difference measured at the BS based on a sounding reference signal (SRS);

identifying a reference time based on the reference time information; and performing the propagation delay compensation based on the time difference information, wherein the information related to propagation delay compensation indicates whether a propagation delay compensation is to be performed by the UE or not to be performed by the UE.

2. The method of claim 1, wherein the reference time information further includes at least one of time information or information associated with a system frame corresponding to the reference time information.

3. The method of claim 1, further comprising:
transmitting the SRS.

4. The method of claim 1,
wherein the time difference information is UE-specific information, and
wherein the time difference information is transmitted in radio resource control (RRC) signaling.

5. The method of claim 1, further comprising:
transmitting, to the BS, a capability report on whether the UE supports performing the propagation delay compensation.

6. The method of claim 1, further comprising:
transmitting, to the BS, request information related to the reference time information.

7. The method of claim 1, further comprising:
receiving, from the BS, time information related to a pre-compensation for propagation delay in case that the information related to propagation delay compensation indicates the propagation delay compensation is not to be performed by the UE.

8. A time synchronization method performed by a base station (BS) in a wireless communication system, the method comprising:

identifying a reference time;

transmitting, to a user equipment (UE), time difference information indicating a receiving and transmitting time difference measured at the BS based on a sounding reference signal (SRS); and transmitting, to the UE, a message including information related to propagation delay compensation and reference time information including time uncertainty information, wherein the information related to propagation delay compensation indicates whether a propagation delay compensation is to be performed by the UE or not to be performed by the UE, and wherein the propagation delay compensation is performed by the UE based on the time difference information.

9. The method of claim 8, wherein the reference time information further includes at least one of time information or information associated with a system frame corresponding to the reference time information.

10. The method of claim 8, further comprising:
receiving, from the UE, the SRS.

11. The method of claim 8,
wherein the time difference information is UE-specific information, and wherein the time difference information is transmitted in radio resource control (RRC) signaling.

12. The method of claim 8, further comprising:
receiving, from the UE, a capability report on whether the UE supports performing the propagation delay compensation.

13. The method of claim 8, further comprising:
receiving, from the UE, request information related to the reference time information.

14. The method of claim 8, further comprising:
performing pre-compensation for propagation delay in case that the information related to propagation delay compensation indicates the propagation delay compensation is not to be performed by the UE; and
transmitting, to the UE, time information related to the pre-compensation.

15. A user equipment (UE) in a wireless communication system, the UE comprising:
a transceiver;
at least one processor coupled with the transceiver; and
memory storing instructions that, when executed by the at least one processor, cause the UE to:
receive, from a base station (BS), a message including information related to propagation delay compensation and reference time information including time uncertainty information,
receive, from the BS, time difference information indicating a receiving and transmitting time difference measured at the BS based on a sounding reference signal (SRS),
identify a reference time based on the reference time information, and
perform the propagation delay compensation based on the time difference information,
wherein the information related to propagation delay compensation indicates whether a propagation delay compensation is to be performed by the UE or not to be performed by the UE.

16. The UE of claim 15, wherein the at least one processor is further configured to:
control the transceiver to transmit the SRS.

17. The UE of claim 15,
wherein the time difference information is UE-specific information, and
wherein the time difference information is transmitted in radio resource control (RRC) signaling.

18. The UE of claim 15, wherein the at least one processor is further configured to:
control the transceiver to transmit, to the BS, a capability report on whether the UE supports performing the propagation delay compensation.

19. The UE of claim 15, wherein the at least one processor is further configured to:
control the transceiver to transmit, to the BS, request information related to the reference time information.

20. The UE of claim 15, wherein the at least one processor is further configured to:
control the transceiver to receive, from the BS, time information related to a pre-compensation for propagation delay in case that the information related to propagation delay compensation indicates the propagation delay compensation is not to be performed by the UE.

* * * * *